(12) United States Patent
Marinello et al.

(10) Patent No.: US 10,907,889 B2
(45) Date of Patent: Feb. 2, 2021

(54) WALL COVERING ASSEMBLY WITH VENTILATED PORTION AND AIR CURTAIN SYSTEM

(71) Applicant: WHIRLPOOL CORPORATION, Benton Harbor, MI (US)

(72) Inventors: Giulia Marinello, Park Ridge, IL (US); Lynne F. Hunter, Dorr, MI (US); Sanjesh Kumar Pathak, Stevensville, MI (US); Alberto R. Gomes, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 49 days.

(21) Appl. No.: 16/310,502

(22) PCT Filed: Aug. 8, 2016

(86) PCT No.: PCT/US2016/045986
§ 371 (c)(1),
(2) Date: Dec. 17, 2018

(87) PCT Pub. No.: WO2018/030979
PCT Pub. Date: Feb. 15, 2018

(65) Prior Publication Data
US 2019/0249918 A1    Aug. 15, 2019

(51) Int. Cl.
*F25D 17/06* (2006.01)
*F25D 23/06* (2006.01)
(Continued)

(52) U.S. Cl.
CPC ............ *F25D 23/068* (2013.01); *F16L 59/06* (2013.01); *F25D 17/065* (2013.01); *F25D 23/02* (2013.01);
(Continued)

(58) Field of Classification Search
CPC ...... F25D 23/068; F25D 23/06; F25D 17/065; F25D 2317/0651; F25D 2317/0665; F25D 2317/0672; F25D 2323/021; F16L 59/06
See application file for complete search history.

(56) References Cited

U.S. PATENT DOCUMENTS 5,765,388 A    6/1998    Jeon
5,784,895 A    7/1998    Choi
(Continued)

FOREIGN PATENT DOCUMENTS

FR    2980963 A1    4/2013
JP    2002168560 A    6/2002
(Continued)

*Primary Examiner* — Ana M Vazquez
(74) *Attorney, Agent, or Firm* — Price Heneveld LLP

(57) ABSTRACT

A refrigerator includes a liner and a wall covering assembly to create a false wall within a refrigerator cabinet. The wall covering assembly includes a top wall spaced-apart from a top wall of the liner, and a rear wall spaced-apart from a rear wall of the liner. The rear wall of the wall covering assembly includes a ventilated portion for providing outwardly directed air to the refrigerator cabinet. A duct assembly is disposed between the wall covering assembly and the liner and is configured to deliver air through the ventilated portion of the wall covering assembly and also deliver air in the form of a downwardly directed air curtain at the front portion of the refrigerator cabinet. The air curtain disrupts the outward flow of air from the ventilated portion of the wall covering assembly at the front portion of the refrigerator cabinet.

17 Claims, 21 Drawing Sheets

(51) Int. Cl.
*F16L 59/06* (2006.01)
*F25D 23/02* (2006.01)

(52) U.S. Cl.
CPC ...... *F25D 23/06* (2013.01); *F25D 2317/0651* (2013.01); *F25D 2317/0665* (2013.01); *F25D 2317/0672* (2013.01); *F25D 2323/021* (2013.01)

(56) References Cited

U.S. PATENT DOCUMENTS

| | | |
|---|---|---|
| 5,791,152 A | 8/1998 | Choi |
| 5,809,799 A | 9/1998 | Jeon |
| 5,819,552 A | 10/1998 | Lee |
| 5,875,642 A | 3/1999 | Lee et al. |
| 6,038,880 A | 3/2000 | Oh |
| 6,094,931 A | 8/2000 | Jeong |
| 6,112,546 A | 9/2000 | Kim |
| 7,254,960 B2 | 8/2007 | Schmid et al. |
| 7,762,100 B2 | 7/2010 | Bae et al. |
| 2009/0151387 A1 | 6/2009 | Fotiadis et al. |
| 2010/0319374 A1* | 12/2010 | Ihle .................. F25D 17/045 62/176.1 |
| 2014/0375198 A1* | 12/2014 | Jeon .................. F25D 25/02 312/404 |

FOREIGN PATENT DOCUMENTS

| | | |
|---|---|---|
| JP | 2002295948 A | 10/2002 |
| JP | 2004061084 A | 2/2004 |
| WO | 03013317 A1 | 2/2003 |
| WO | 2006032934 A1 | 3/2006 |

\* cited by examiner

WALL COVERING ASSEMBLY WITH VENTILATED PORTION AND AIR CURTAIN SYSTEM

TECHNICAL FIELD

The present concept relates to a refrigeration device, and more particularly, to a refrigerator having a wall covering for concealing an air curtain system.

SUMMARY

One aspect of the present concept includes a refrigerator having an external wrapper and a liner disposed within the external wrapper. The liner includes a top wall, first and second sidewalls, a bottom wall and a rear wall. A wall covering assembly includes a top wall disposed adjacent to and spaced-apart from the top wall of the liner, and a rear wall disposed adjacent to and spaced-apart from the rear wall of the liner. In assembly, the liner and the wall covering assembly cooperate to define a refrigerator cabinet. A cavity is formed between the liner and the wall covering assembly and includes a first portion disposed between the rear wall of the liner and the rear wall of the wall covering assembly, and a second portion disposed between the top wall of the liner and the top wall of the wall covering assembly. A duct assembly includes an upright portion disposed in the first portion of the cavity and a lateral portion disposed in the second portion of the cavity.

Another aspect of the present concept includes a refrigerator having a liner and a wall covering assembly. The liner includes a top wall, first and second sidewalls, a bottom wall and a rear wall. The wall covering assembly includes a top wall and a rear wall having a ventilated portion. In assembly, the wall covering assembly is spaced-apart from the liner to form a cavity therebetween. A duct assembly includes an upright portion disposed along the rear wall of the wall covering assembly. The upright portion includes one or more access apertures opening into the ventilated portion of the rear wall of the wall covering assembly to deliver cooled air to a refrigerator cabinet defined by the wall covering assembly and the liner.

Yet another aspect of the present concept includes a refrigerator having a liner with a top wall, a rear wall, first and second sidewalls and a bottom wall. A wall covering assembly includes a top wall disposed adjacent to and spaced-apart from the top wall of the liner and a rear wall disposed adjacent to and spaced-apart from the rear wall of the liner. Together, the liner and the wall covering assembly cooperate to define a refrigerator cabinet in assembly. The rear wall of the wall covering assembly includes a ventilated portion for providing outwardly directed air to the refrigerator cabinet. A duct assembly is disposed between the wall covering assembly and the liner and is configured to deliver air to a front portion of the refrigerator cabinet to create a downwardly directed air curtain at the front portion of the refrigerator cabinet. The air curtain disrupts a flow of the outwardly directed air from the ventilated portion of the wall covering assembly at the front portion of the refrigerator cabinet.

These and other features, advantages, and objects of the present device will be further understood and appreciated by those skilled in the art upon studying the following specification, claims, and appended drawings.

DETAILED DESCRIPTION OF EMBODIMENTS

Figure 1:
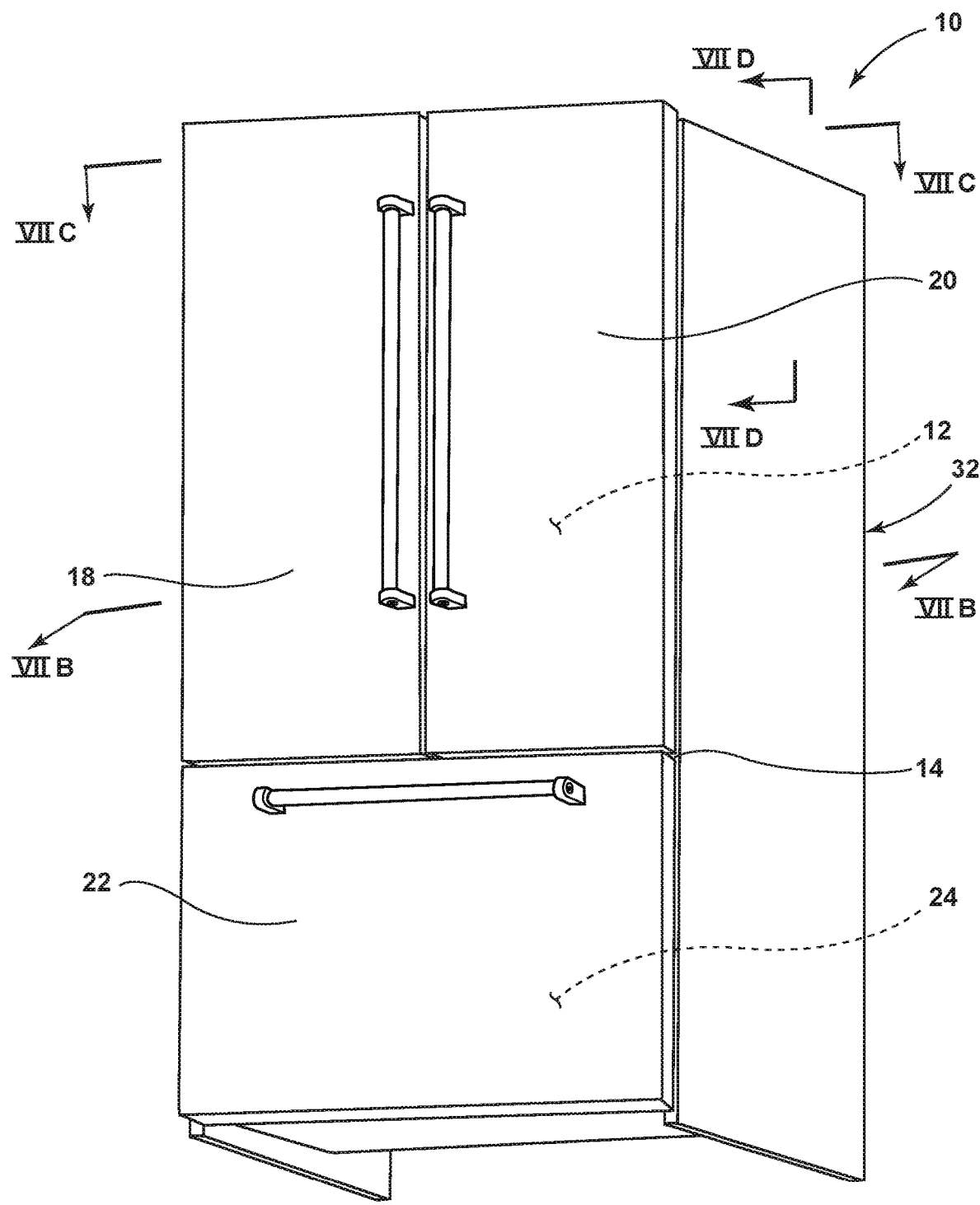
FIG. 1 is a front perspective view of a refrigerator according to one embodiment of the present concept.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
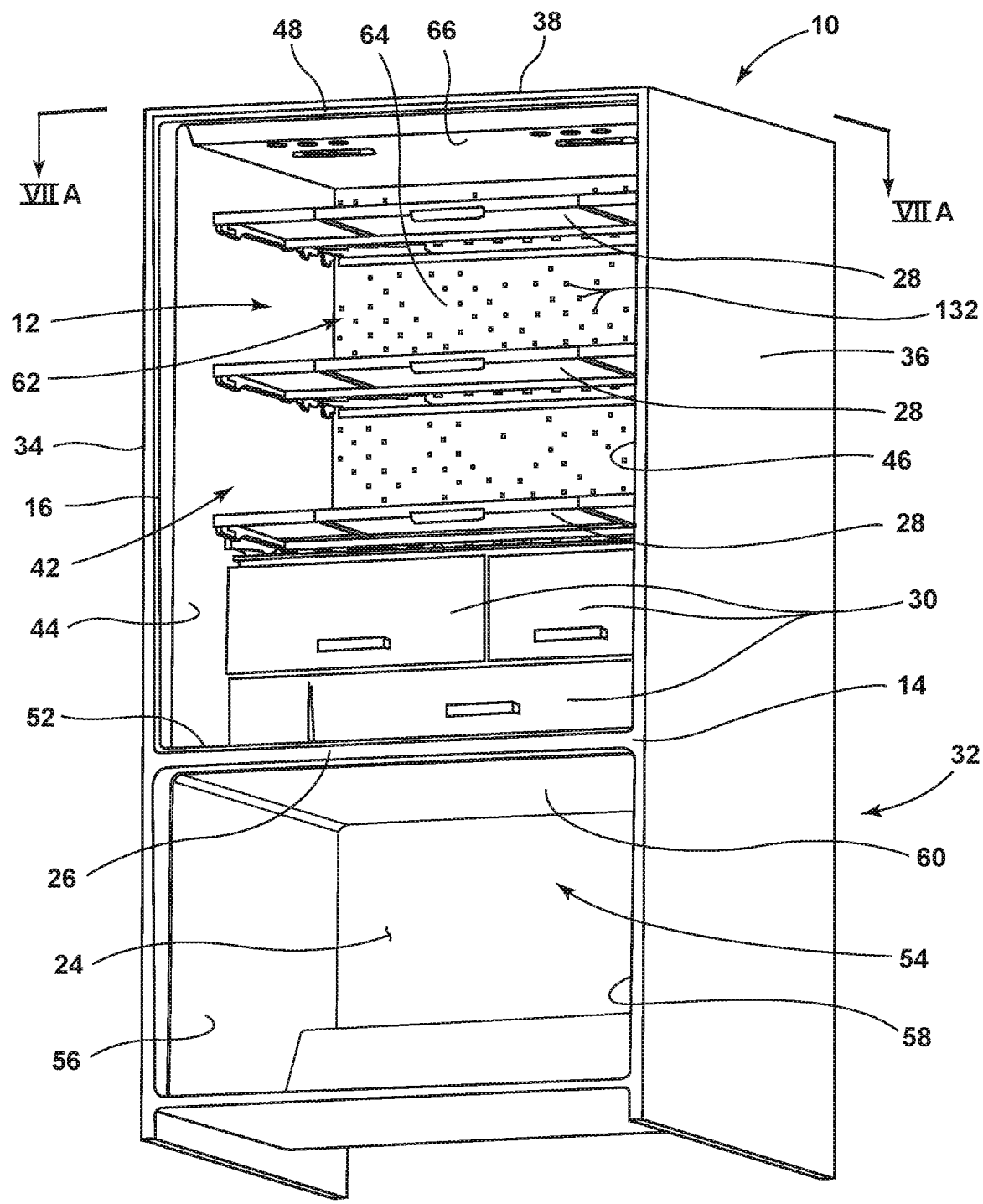
FIG. 2 is a front perspective view of the refrigerator of FIG. 1 with doors and drawers removed to reveal a refrigerator cabinet and a freezer cabinet.

Referring now to FIG. 1, a refrigerator 10 is shown having a front surface 14 that is generally disposed around a front opening 16 (FIG. 2) of a refrigerator cabinet 12 (FIG. 2). The refrigerator cabinet 12 is contemplated to be an insulated space for storing fresh food items having first and second doors 18, 20 that are rotatably coupled to the front surface 14 of the refrigerator cabinet 12 for selectively providing access to the refrigerator cabinet 12. In the embodiment shown in FIG. 1, a freezer drawer 22 is configured to selectively provide access to a freezer cabinet 24 (FIG. 2) disposed below the refrigerator cabinet 12. The refrigerator 10 shown in FIG. 1 is an exemplary embodiment of a refrigerator for use with the present concept, and is not meant to limit the scope of the present concept in any manner.

Figure 7A:
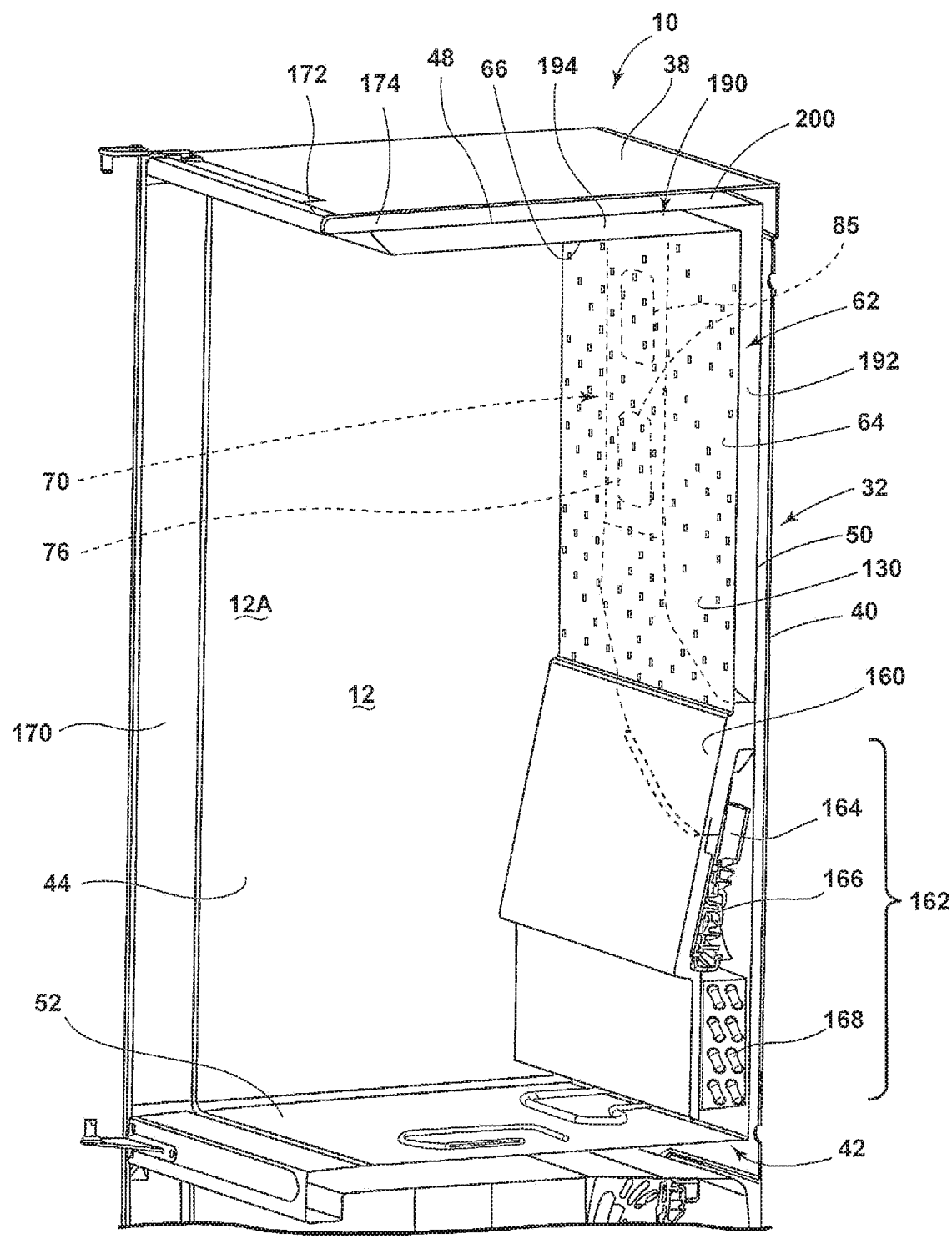
FIG. 7A is a cross-sectional view of the refrigerator of FIG. 2 take at line VIIA.

Referring now to FIG. 2, the refrigerator 10 is shown with the first and second doors 18, 20 and freezer drawer 22 removed to reveal the refrigerator cabinet 12 and freezer cabinet 24 which are separated by a mullion 26. In the embodiment of FIG. 2, a number of shelves 28 are shown disposed in the refrigerator cabinet 12 and are contemplated to be vertically adjustable therein. The refrigerator cabinet 12 also includes a number of drawers 30 for storing various items, such as fresh fruits and vegetables, in specific temperature controlled environments. The refrigerator 10 includes an exterior wrapper 32 which includes first and second side walls 34, 36, top wall 38 and rear wall 40 (FIG. 7A). The exterior wrapper 32 is contemplated to be a metal component formed of a sheet metal material. The refrigerator 10 further includes a refrigerator liner 42 which includes first and second side walls 44, 46, top wall 48, rear wall 50 (FIG. 7A) and bottom wall 52. The freezer cabinet 24 also includes a freezer liner 54 having first and second side walls 56, 58 and top wall 60. The refrigerator liner 42 and freezer liner 54 are also contemplated to be metal components made of a sheet metal material that is bent and welded to the specifications of the refrigerator 10. As encapsulated by the exterior wrapper 32, the refrigerator liner 42 and freezer liner 54 are spaced-apart from the exterior wrapper 32 to provide an insulating space therebetween, as further described below.

As further shown in FIG. 2, a wall covering assembly 62 includes a rear wall 64 and a top wall 66 disposed over and adjacent to the rear wall 50 (FIG. 7A) and top wall 48 of the refrigerator liner 42. In this way, the wall covering assembly 62 defines rearmost and uppermost parameters of the refrigerator cabinet 12 at rear wall 64 and top wall 66. The wall covering assembly 62 is configured to conceal cooling components of the refrigerator 10, and also conceal air distribution systems for the cooling of the refrigerator cabinet 12 and for specifically directing air flow for an air curtain system as further described below. As shown in FIG. 2, the rear wall 64 of the wall covering assembly 62 is a ventilated wall having a plurality of ports 132 disposed therethrough. The rear wall 64 of the wall covering assembly 62 is configured to provide cooled air to the refrigerator cabinet 12 in use, as further described below.

Figure 3A:
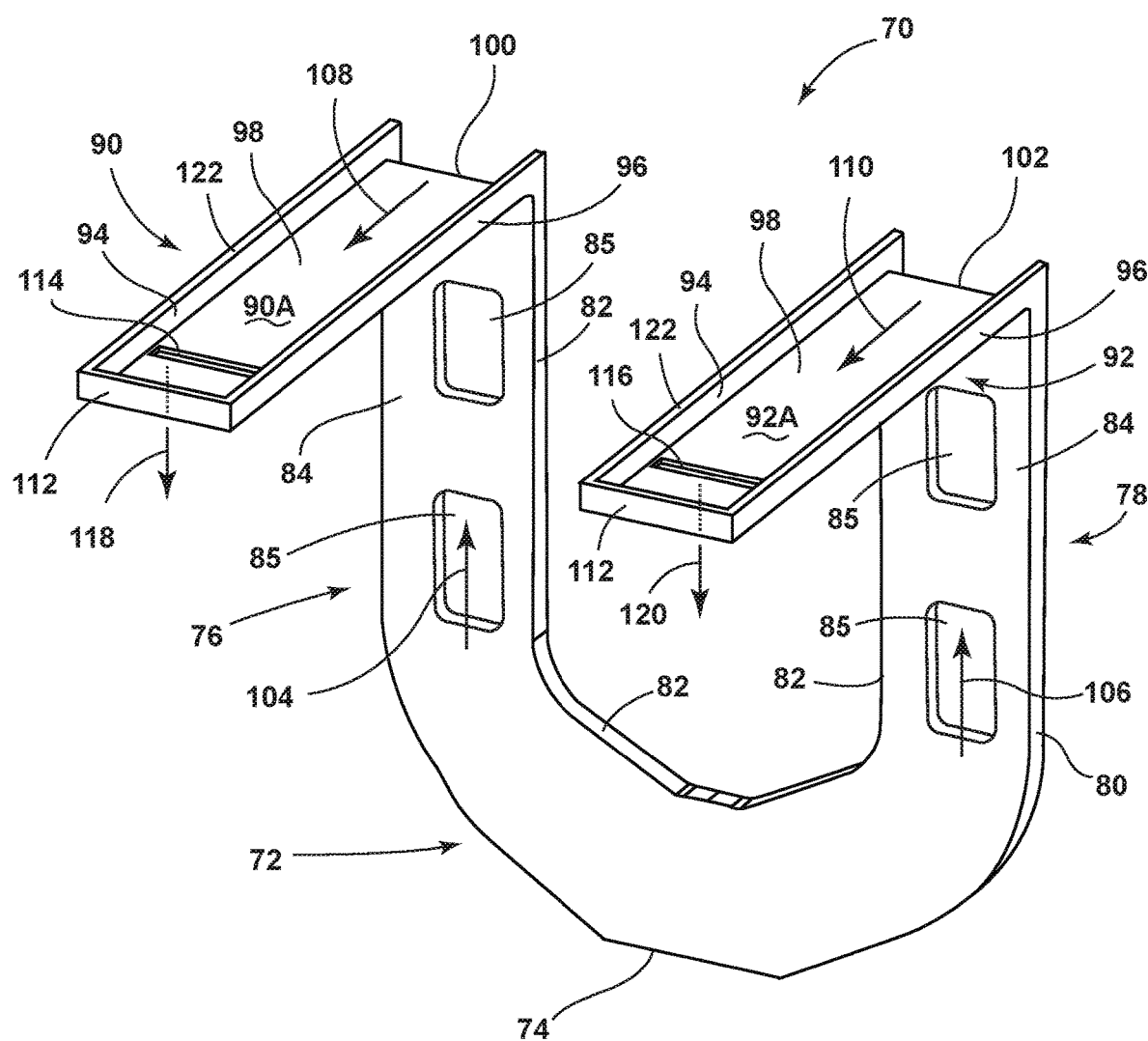
FIG. 3A is a top perspective view of a duct assembly for an air curtain system.
Figure 3B:
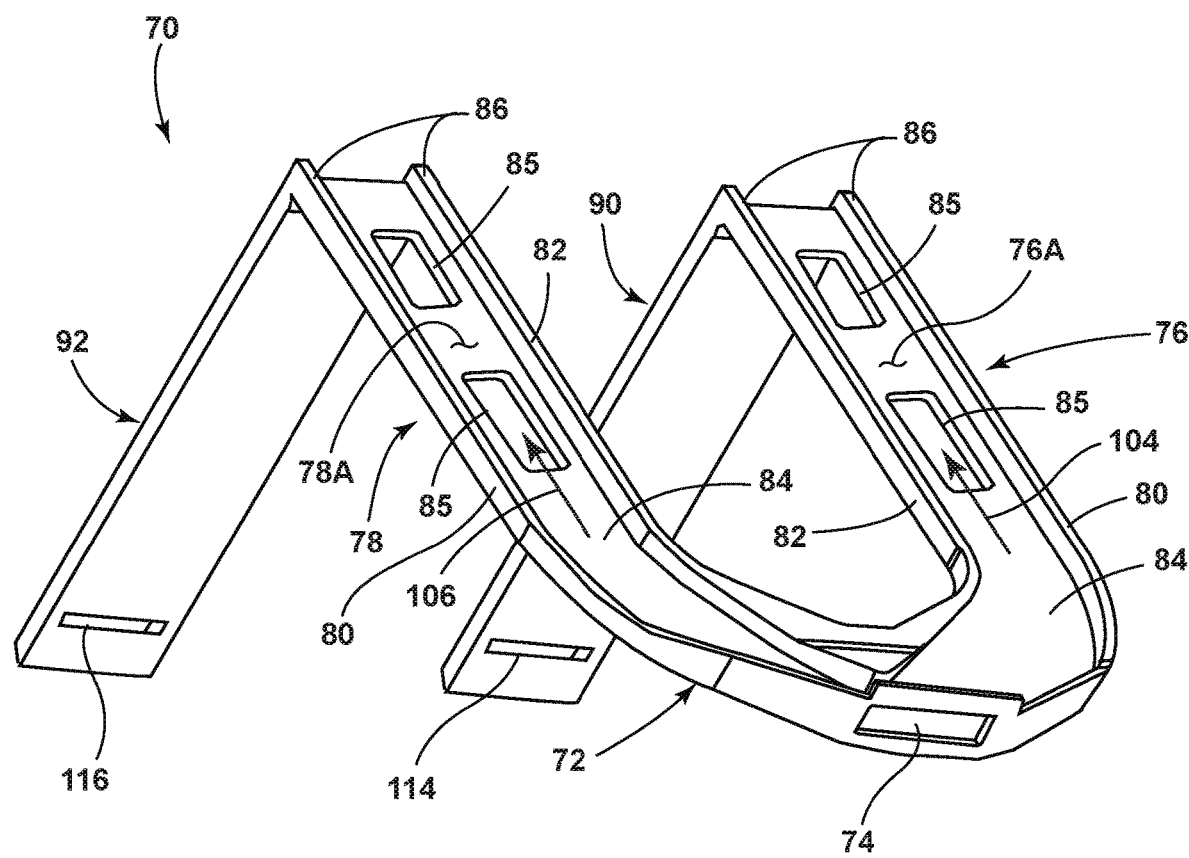
FIG. 3B is a bottom perspective view of the duct assembly of FIG. 3A.
Figure 6:
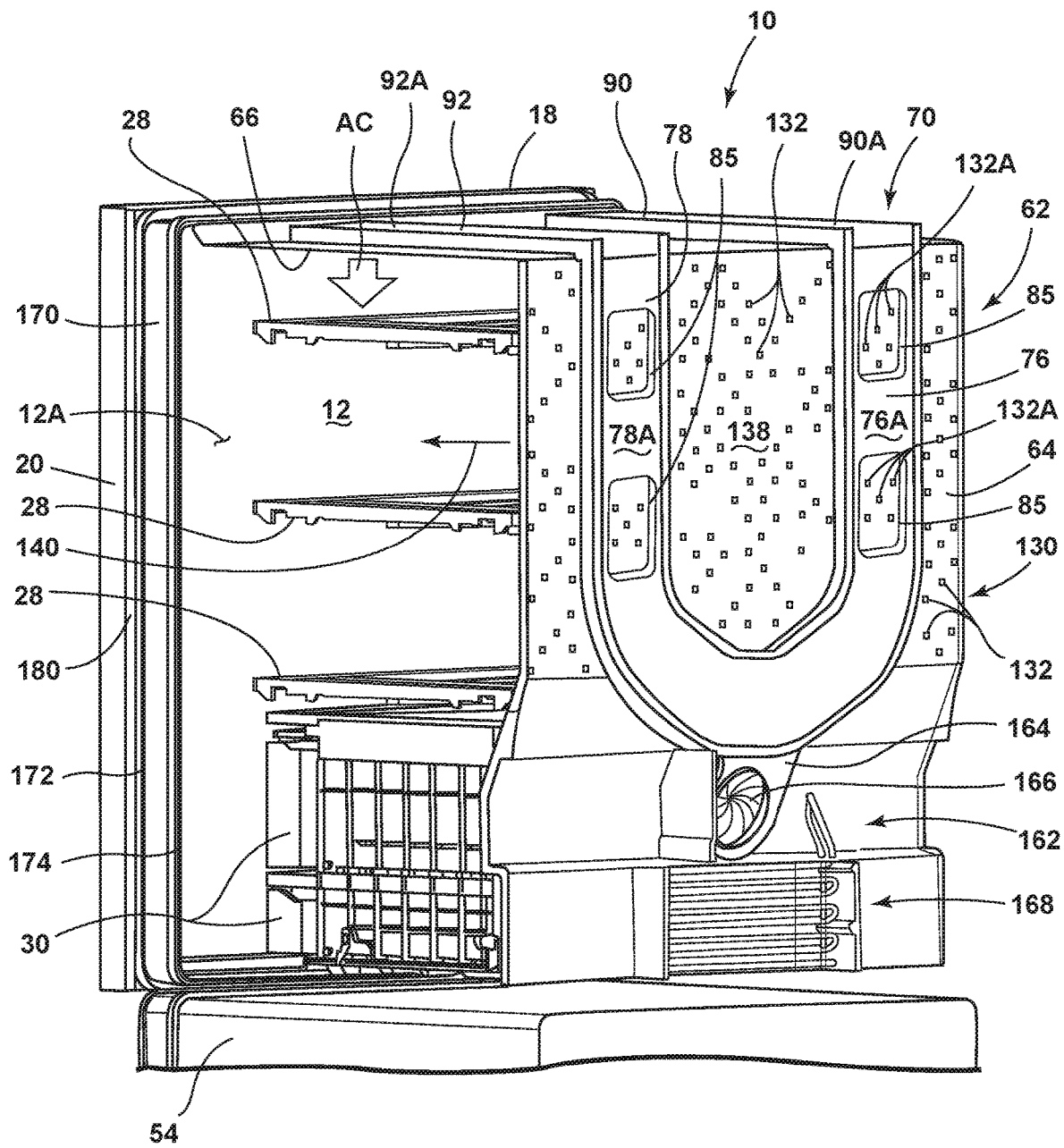
FIG. 6 is a rear perspective view of the refrigerator of FIG. 2 with an exterior liner and wrapper removed therefrom to reveal the wall covering assembly and air curtain assembly of the present concept.

Referring now to FIGS. 3A and 3B, a duct assembly 70 is shown. The duct assembly 70 is configured to be concealed by the wall covering assembly 62 as best shown in FIG. 6. The duct assembly 70 includes a lower portion 72 having a lower opening 74 (FIG. 3B) disposed therethrough. In assembly, the lower opening 74 is configured to align with a housing for a radial fan for providing air to the duct assembly 70 as powered by the radial fan (FIG. 6). Extending upwardly from the lower portion 72, first and second upright ducts 76, 78 define an upright portion of the duct assembly 70. The first and second upright ducts 76, 78 each include first and second side walls 80, 82, which are spaced-apart and interconnected by front walls 84 as best shown in FIG. 3B. Thus, as shown in FIG. 3B, the first and second side walls 80, 82 and front wall 84 of the first and second upright ducts 76, 78 form vertical channels 76A, 78A which open outwardly towards the rear wall 50 of the refrigerator liner 42 in assembly. The first and second side walls 80, 82 include outermost contact surfaces 86 which are configured to contact the rear wall 50 of the refrigerator liner 42 to substantially close off the channels 76A, 78A for channeling air upwards along the first and second upright ducts 76, 78 as powered by the radial fan. At the uppermost portions of the first and second upright ducts 76, 78, first and second upper ducts 90, 92 outwardly extend in a substantially horizontal manner to define a lateral portion of the duct assembly 70. The upper ducts 90, 92 each include first and second side walls 94, 96 which are interconnected by bottom walls 98 to form upwardly opening horizontal channels 90A, 92A, respectively. At rear portions 100, 102 of the channels 90A, 92A, channels 90A, 92A are fluidly connected with channels 76A, 78A, respectively. Thus, air flow is configured to flow upward in a direction as indicated by arrows 104, 106 in vertical channels 76A, 78A, respectively, and is then directed outwardly in the directions as indicated by arrows 108, 110 along channels 90A, 92A, respectively. As the air flows along the channels 90A, 92A towards an end wall 112 thereof, the air is directed downward through downwardly opening vents 114, 116 in the direction as indicated by arrows 118, 120 (FIG. 3A). Channels 90A, 92A are upwardly opening channels defined by first and second side walls 94, 96 which include uppermost contact surfaces 122 which are configured to be engaged with the top wall 48 of the refrigerator liner 42 (FIG. 2), or other like structure, for closing off the upwardly opening channels 90A, 92A. In this way, the channels 90A, 92A are configured to direct air flow to the downwardly opening vents 114, 116 for providing an air curtain within the refrigerator cabinet 12 which can create an air barrier for blocking direct air flow to the gaskets of the refrigerator 10, and for keeping cold air inside the refrigerator cabinet 12, as further described below.

Figure 5:
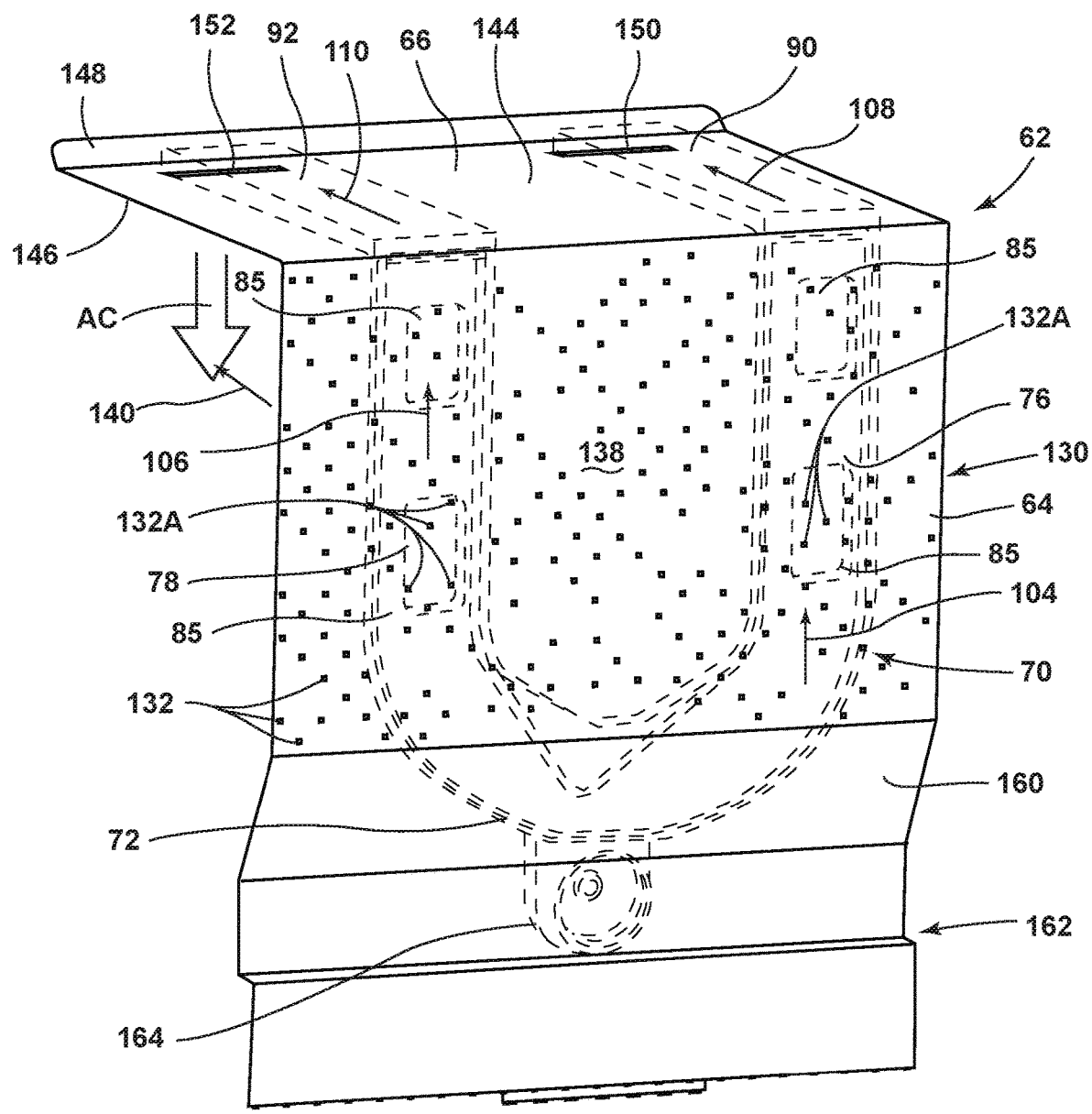
FIG. 5 is a rear perspective view of the wall covering assembly of FIG. 4 having the duct assembly of FIG. 3A coupled thereto.

With further reference to FIGS. 3A and 3B, the outwardly opening vertical channels 76A, 78A of the duct assembly 70 are shown with the outwardly extending upper ducts 90, 92 extending in a substantially perpendicular manner relative to the first and second lower ducts 76, 78. The configuration of the duct assembly 70 is configured to compliment the configuration of the wall covering assembly 62, as shown in FIG. 5, and the refrigerator liner 42, as shown in FIG. 7A. As further shown in FIGS. 3A and 3B, the first and second upright ducts 76, 78 include a plurality of access apertures 85 disposed through the front wall 84 thereof. The access apertures 85 are configured to allow for air to pass through the upright ducts 76, 78 as air is directed in the travel paths as indicated by arrows 104 and 106. In this way, the upwardly directed air can escape through the access apertures 85 to provide cooling air to the refrigerator cabinet 12 through the ventilated rear wall 64 of the wall covering assembly 62, as further described below.

Figure 4:
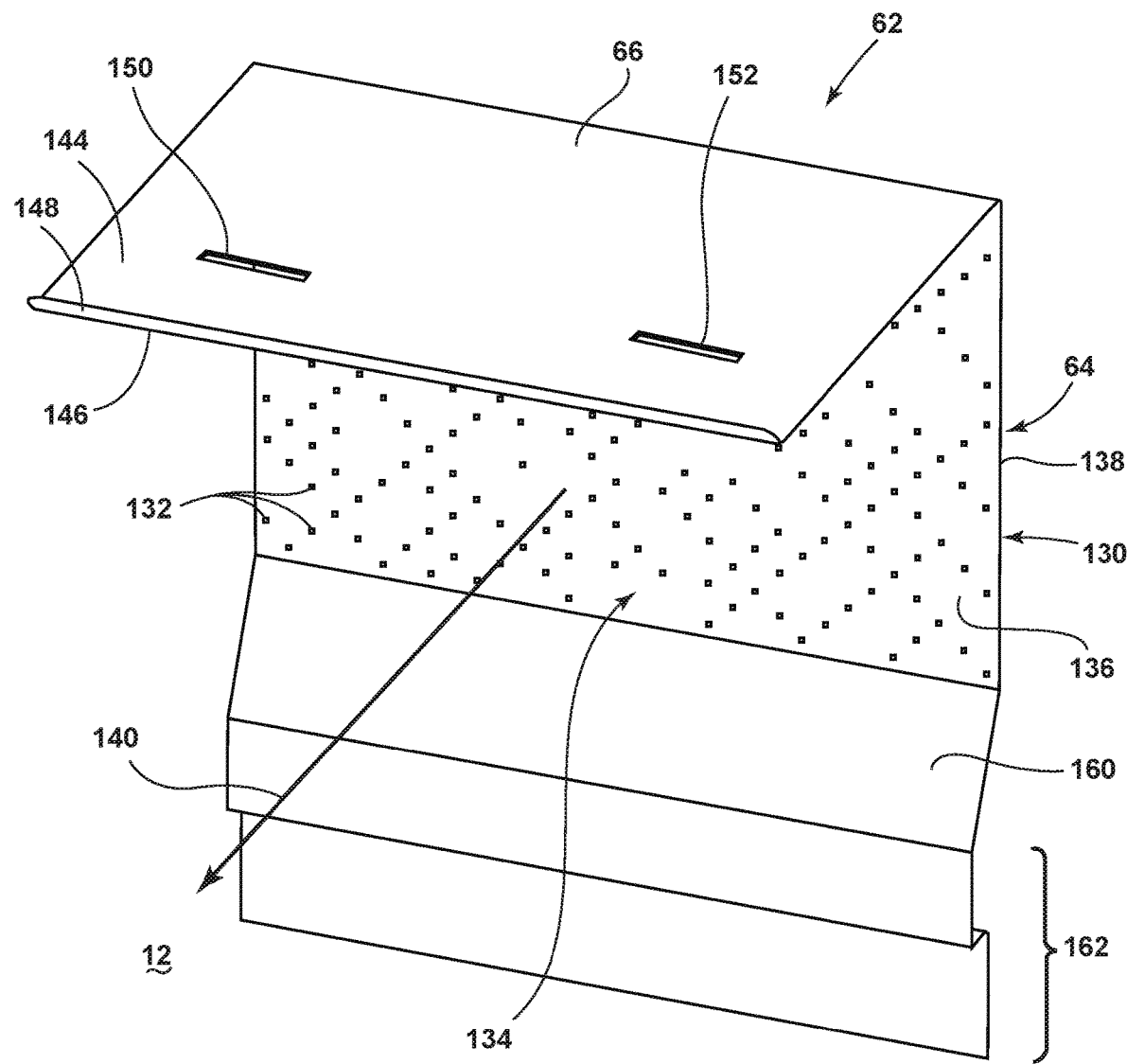
FIG. 4 is a top perspective view of a wall covering assembly.

Referring now to FIG. 4, the wall covering assembly 62 is shown having rear wall 64 and top wall 66, wherein the rear wall 64 is substantially vertical with top wall 66 extending outwardly therefrom in a substantially perpendicular or horizontal manner. As shown in FIG. 4, the rear wall 64 includes a ventilated portion 130 which is a substantially planar portion having a plurality of ports 132 disposed therethrough. Specifically, the ports 132 define venting apertures dispersed across the ventilated portion 130, such that the entire ventilated portion 130 includes a designed pattern 134 made up of the ports 132 disposed therethrough. The ventilated portion 130 includes an outer surface 136 and an inner surface 138. It is the inner surface 138 of the ventilated portion 130 that is contemplated to contact the front wall 84 of the upright ducts 76, 78 of the duct assembly 70 shown in FIG. 3A. Further, it is contemplated that a number of the ports 132 (FIG. 5) of the pattern 134 will be aligned with the access apertures 85 of the upright ducts 76, 78, such that the air flow will not only be directed in an upward direction in the outwardly opening channels 76A, 78A, as indicated by arrows 104, 106 in FIG. 3A, but will also be directed outwardly towards the refrigerator cabinet 12 in a direction as indicated by arrow 140 in FIG. 4 from the access apertures 85 of the upright ducts 76, 78.

As further shown in FIG. 4, the top wall 66 of the wall covering assembly 62 includes an inner surface 144 and an outer surface 146. A front lip portion 148 is disposed at a front edge of the top wall 66 as shown in FIG. 4. The top wall 66 further includes venting slots 150, 152 which are configured to align with the downwardly opening vents 114, 116 of the duct assembly 70 shown in FIGS. 3A and 3B. In this way, air channeled through the duct assembly 70 is directed downwardly through the downwardly opening vents 114, 116, in the direction indicated by arrows 118, 120 in FIG. 3A for dispersement into the refrigerator cabinet 12 through venting slots 150, 152 of the wall covering assembly 62. Thus, the ports 132 open outwardly into the refrigerator cabinet 12 for cooling the refrigerator cabinet 12 with an air flow directed in a perpendicular manner emanating from the ventilated portion 130 of the wall covering assembly 62 as indicated by arrow 140. Further, an air curtain (AC FIG. 5) will be created by the air directed downwardly through venting slots 150, 152 which will help prevent the air exiting the ports 132, indicated by arrow 140, from directly contacting the doors 18, 20 (FIG. 1) of the refrigerator 10, and also from directly contacting gaskets disposed around the doors 18, 20, as further described below. Refrigerated air directly contacting the gaskets of the refrigerator 10 may cause condensation on outer surfaces of the gaskets, which are exposed to the ambient air of the room in which the refrigerator 10 is disposed. This condensation is an undesired effect of cooling the refrigerator cabinet 12, such that the present concept provides an air curtain (AC FIG. 5) for preventing outwardly directed cooled air along path 140 emanating from the ventilated portion of the wall covering assembly 62 from reaching the gaskets without disruption.

As further shown in FIG. 4, the wall covering assembly 62 also includes an inclined portion 160 which generally defines a housing area 162 which is used to house and conceal components used to cool air for cooling the refrigerator cabinet 12. Such components may include fans for directing the cooled air, evaporators, condensers and other components (i.e., electrical components) of the refrigerator 10. As better shown in FIGS. 6 and 7, the wall covering assembly 62 provides a false wall to the refrigerator cabinet 12 that is spaced-apart from the refrigerator liner 42, such that the duct assembly 70 and other components of the refrigerator 10 can also be concealed behind the false wall of wall covering assembly 62.

Referring now to FIG. 5, the duct assembly 70 is shown in phantom as mounted on the wall covering assembly 62 at inner surfaces 144, 138 of the wall covering assembly 62. Specifically, the upper ducts 90, 92 are shown disposed on the inner surface 144 of the top wall 66 of the wall covering assembly 62. First and second upright ducts 76, 78 are shown disposed on the rear inner surface 138 of the rear wall 64 of the wall covering assembly 62 at ventilated portion 130. As shown in FIG. 5, a number of the ports 132A of ports 132 are aligned with the access apertures 85 of the first and second upright ducts 76, 78 which will provide air flow in an outward direction as indicated by arrow 140. Thus, the ports 132A disposed on the ventilated portion 130 of the wall covering assembly 62 will direct air in the direction as indicated by arrow 140 towards a front portion of the refrigerator cabinet 12. An air curtain AC is defined by the downwardly directed air flowing from venting slots 150, 152 as channeled to the venting slots 150, 152 of the wall covering assembly 62 by first and second upper ducts 90, 92. The air curtain AC shown in FIG. 5 is substantially defined by the downward air flow indicated by arrows 118, 120 shown in FIG. 3A of the duct assembly 70. As shown in FIG. 5, the air curtain AC intersects and disrupts the outward air flow 140 from ports 132A, such that the outward flow of air in the direction as indicated by arrow 140 will not directly contact the front portion of the refrigerator cabinet 12, but will instead be disrupted by the air curtain AC. In this way, a condensation effect on a gasket for the refrigerator 10 can be avoided, as further described below. As further shown in FIG. 5, a fan housing 164 is shown disposed at the lower portion 72 of the duct assembly 70 which is configured to house a radial fan for propelling air along the duct assembly 70 as indicated by arrows 104, 106, 108 and 110 and further downward in the direction as indicated by arrows 118, 120 (FIG. 3A) to create the air curtain AC. The fan housing 164 is disposed in the housing area 162 defined by the wall covering assembly 62 at inclined portion 160, as better shown in FIGS. 6 and 7A.

Referring now to FIG. 6, the refrigerator 10 is shown with the exterior wrapper 32 and liner 42 removed to reveal the duct assembly 70 disposed on the wall covering assembly 62. As noted above, the duct assembly 70 is configured to create an air curtain AC along a front portion 12A of the refrigerator cabinet 12. The front portion 12A of the refrigerator cabinet 12 is shown disposed adjacent to the second door 20 of the refrigerator 10 and is contemplated to provide air flow in a downward direction between the first and second doors 18, 20 and the outermost portions of the shelves 28 and drawers 30. In this way, the air curtain AC will intercept or otherwise disrupt the flow of air from the ports 132A of the ventilated portion 130 of the wall covering assembly 62 shown outwardly directed into the refrigerator cabinet 12 in the direction as indicated by arrow 140. As specifically shown in FIG. 6, a trim breaker 170 includes a stepped configuration having an outer rim 172 and an inner rim 174. The trim breaker 170 is configured to couple the exterior wrapper 32 (FIG. 2) to the liner 42 (FIG. 2). Specifically, the exterior wrapper 32 will couple to the outer rim 172 of the trim breaker 170, and the liner 42 will couple to the inner rim 174 of the trim breaker 170. Between the trim breaker 170 and the doors 18, 20, a gasket 180 is positioned. The gasket 180 is contemplated to be coupled to the door and configured to form a seal against the front surface 14 (FIGS. 1 and 2) of the refrigerator 10 and the doors 18, 20. Specifically, the gasket 180 forms a seal against the front surface 14 of the refrigerator 10 when the first and second doors 18, 20 are in the closed position as shown in FIG. 1. The air curtain AC of the present concept is provided to prevent cooled air, distributed through the ventilated portion 130 of the wall covering assembly 62, from directly contacting the gasket assembly 180. The gasket assembly 180 is contemplated to be a polymeric part that is in contact with the room environment outside of the refrigerator 10, as well as the cooled compartment of the refrigerator compartment 12. Air flow in the direction as indicated by arrow 140 may cause condensation to form on the outer surfaces of the gasket assembly 180 if this air flow is not disrupted by the air curtain AC of the present concept. Thus, the duct assembly 70 includes the upper lateral ducts 90, 92 which extend across the top wall 66 of the wall covering assembly 62 to properly position the air curtain AC at the front portion 12A of the refrigerator cabinet 12 for disrupting direct contact between the cooled air distributed through the ventilated portion 130 of the wall covering assembly 62 in the direction as indicated by arrow 140, and the gasket assembly 180. The gasket assembly 180 may include a number of separate gaskets used to seal the doors 18, 20 individually.

As further shown in FIG. 6, a fan 166 is shown positioned within the fan housing 164 for providing cooled air to the duct assembly 70. In the embodiment shown in FIG. 6, the fan 166 is a radial fan disposed above an evaporator 168. The evaporator 168 is configured to provide cooled air to the housing area 162 defined between the wall covering assembly 62 and the liner 42 for dissemination of the cooled air into the refrigerator cabinet 12 via the ports 132A disposed on the ventilated portion 130 of the wall covering assembly 62. Further, the fan 166 is configured to draw cooled air provided by the evaporator 168 into the duct assembly 70 for moving the cooled air in a downward direction at the air curtain AC along the front portion 12A of the refrigerator cabinet 12. In this way, the cooled air is not only provided by the ventilated portion 130 of the wall covering assembly 62, but is also provided by the downward air flow of the air curtain AC into the refrigerator cabinet 12. Thus, the fan assembly 166 is in thermal communication with the evaporator 168 and is fluidly connected to the duct assembly 70 within the housing area 162. The fan assembly 166 is configured to move cooled air from the evaporator 168 to the duct assembly 70 and propel the air through the upright ducts 76, 78 and upper ducts 90, 92. The evaporator 168 and fan assembly 166 are substantially concealed by the wall covering assembly 62 within the refrigerator cabinet 12 in assembly.

As noted above, the air curtain AC directs air flow along the front portion 12A of the refrigerator cabinet 12 which is positioned along inner surfaces of the doors 18, 20 and distal ends of the shelves 28 and drawers 30. It is further contemplated that the air curtain AC may be provided for accelerated air flow when the doors 18, 20 are opened in order to retain cooled air within the refrigerator cabinet 12 while a user keeps one or both of the doors 18, 20 in an open position. As further noted in FIG. 6, the evaporator 168 and fan 166 are disposed within the housing area 162 created by the wall covering assembly 62. In this way, the wall covering assembly 62 creates a false wall disposed at both the rear portion and upper portion of the refrigerator cabinet 12 to conceal the fan 166 and evaporator 168, as well as the duct assembly 70, and other like components used to cool the refrigerator cabinet 12. As further shown in FIG. 6, channels 76A, 78A, 90A, 92A are outwardly opening channels which are closed off in assembly by the rear wall 50 of the refrigerator liner 42, as shown in FIG. 7B, and further closed off by top wall 48 of the refrigerator liner 42, as shown in FIG. 7C.

Referring now to FIG. 7A, the refrigerator 10 is shown with the exterior wrapper 32 disposed around the refrigerator liner 42 to create a spacing 200 therebetween, which may be a vacuum insulated space. As shown in FIG. 7A, the refrigerator liner 42 includes a rear wall 50 that is adjacent to and spaced-apart from the rear wall 64 of the wall covering assembly 62. Similarly, the top wall 48 of the refrigerator liner 42 is disposed adjacent to and spaced-apart from the top wall 66 of the wall covering assembly 62. Thus, as shown in FIG. 7A, a cavity 190 is formed between the spaced-apart portions of the refrigerator liner 42 and the wall covering assembly 62. The cavity 190 includes a first portion 192 that extends between the rear wall 64 of the wall covering assembly 62 and the rear wall 50 of the refrigerator liner 42. As shown in FIG. 7A, the first portion 192 of the cavity 190 houses the vertical section of the duct assembly 70, which is indicated as upright duct 76 in FIG. 7A. The cavity 190 further includes a second portion 194 that extends outwardly in a substantially horizontal manner relative to the first portion 192. The second portion 194 is configured to house the upper or lateral ducts 90, 92 (FIG. 6) of the duct assembly 70, such that the duct assembly 70 can direct air for the air curtain to the front portion 12A of the refrigerator cabinet 12 in a concealed manner within the second portion 194 of the cavity 190. As further shown in FIG. 7A, the inner and outer rim portions 172, 174 of the trim breaker 170 are shown coupled to the exterior wrapper 32 and the liner 42, respectively.

Figure 7B:
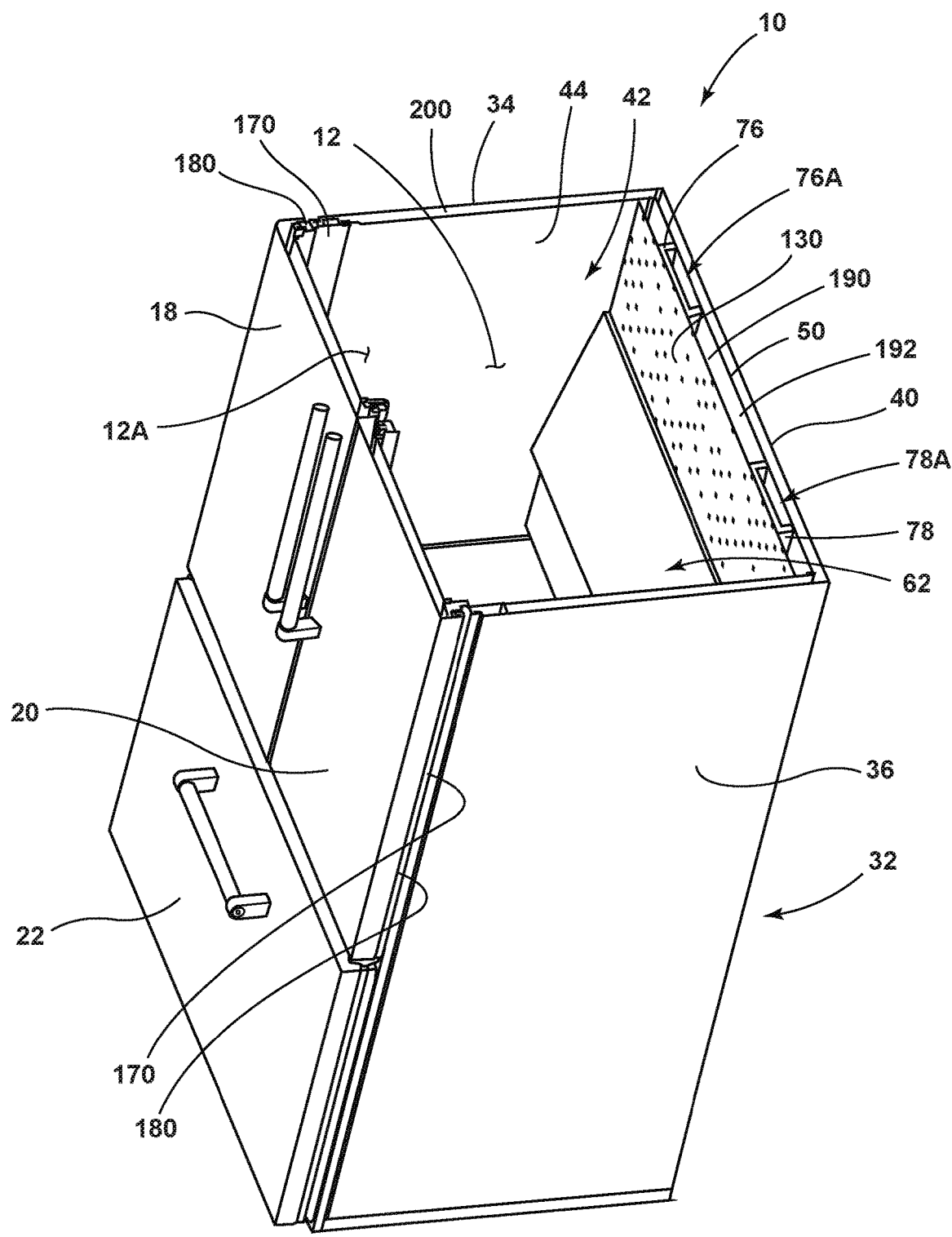
FIG. 7B is a cross-sectional view of the refrigerator of FIG. 1 take at line VIIB.

Referring now to FIG. 7B, the cross-sectional view of the refrigerator 10 shows the first portion 192 of the cavity 190 having the first and second upright ducts 76, 78 disposed therein with channels 76A, 78A, respectively. In FIG. 7B, the rear wall 50 of the refrigerator liner 42 is shown as well as rear wall 40 of the exterior wrapper 32. As noted above, a spacing 200 exists between the exterior wrapper 32 and the refrigerator liner 42 which may be a vacuum insulated space for insulating the refrigerator cabinet 12. In the embodiment shown in FIG. 7B, the gasket 180 is shown on both doors 18, 20 relative to the trim breaker 170. As shown in FIG. 7B, channels 76A, 78A are closed by the rear wall 50 of the refrigerator liner 42 to properly channel air upward in the duct assembly 70. As noted above, air will also be directed outwardly into the refrigerator cabinet 12 through ports 132A that align with access apertures 85 of the channel 76A, 78A, as best shown in FIG. 6.

Figure 7C:
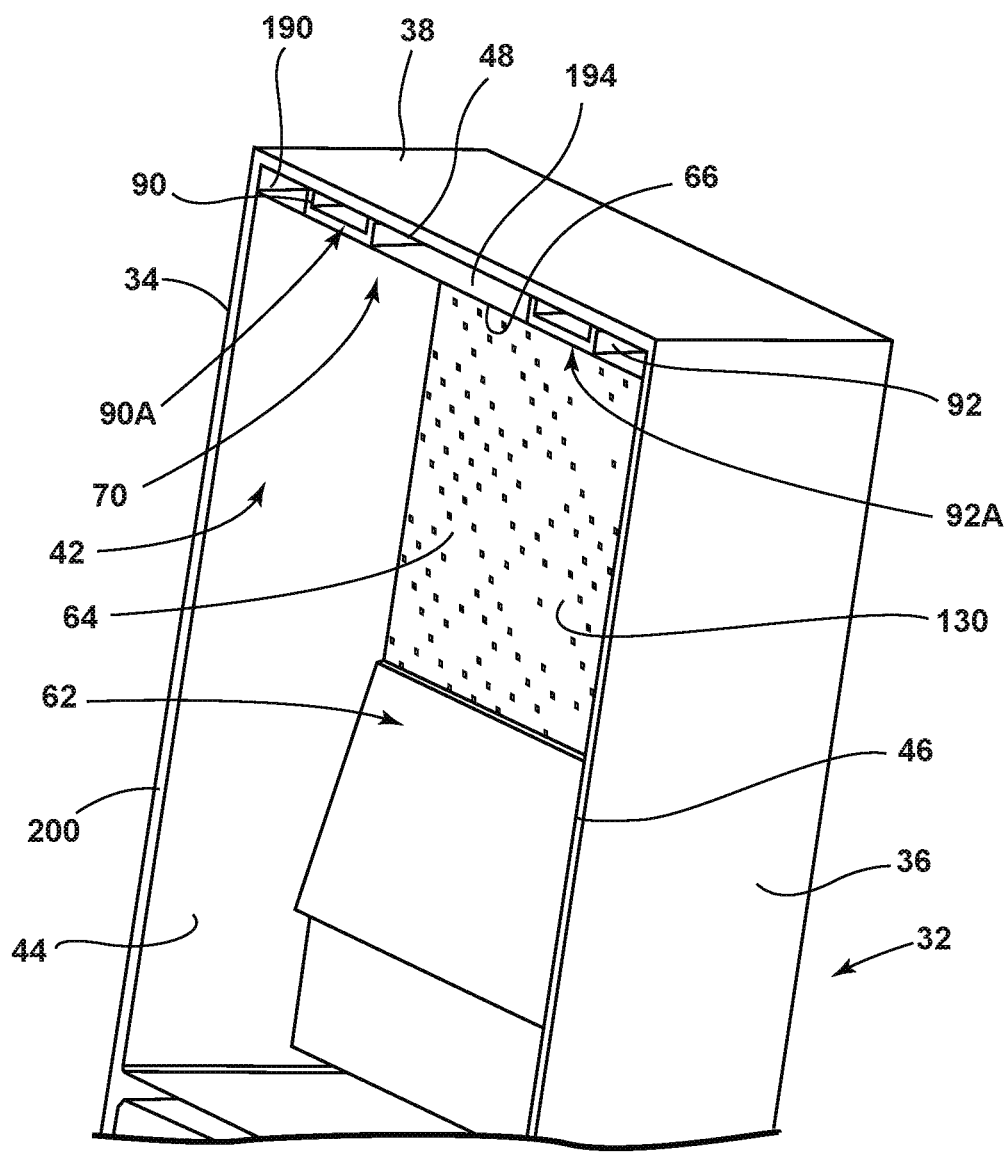
FIG. 7C is a cross-sectional view of the refrigerator of FIG. 1 take at line VIIC.

Referring now to FIG. 7C, the second portion 194 of the cavity 190 is shown housing the upper lateral ducts 90, 92 having channels 90A, 92A, respectively. The upwardly or outwardly opening channels 90A, 92A are shown closed off by a top wall 48 of the refrigerator liner 42 for properly channeling air towards the downwardly opening venting slots 150, 152 for providing the air curtain AC as shown in FIG. 5.

Figure 7D:
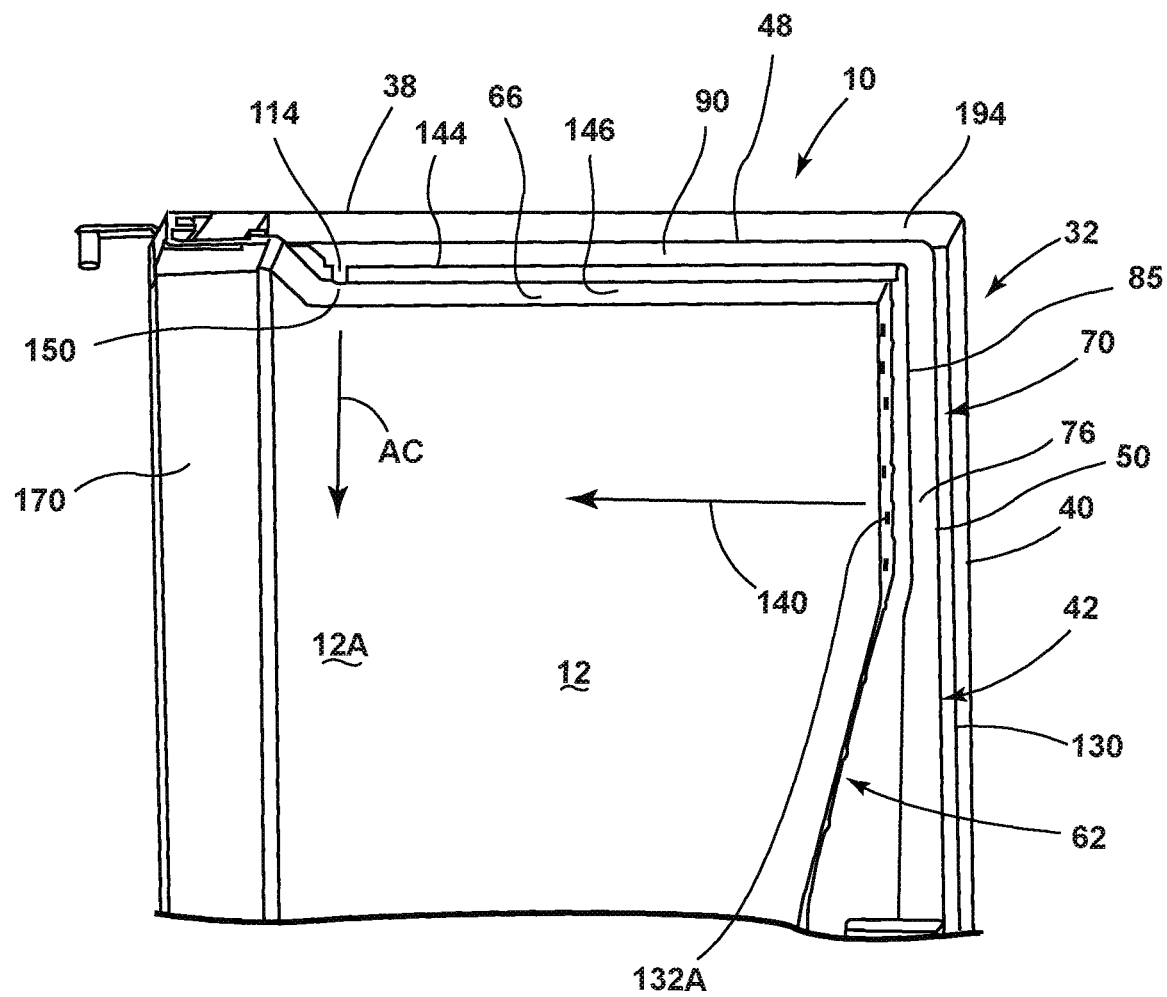
FIG. 7D is a cross-sectional view of the refrigerator of FIG. 1 take at line VIID.

Referring now to FIG. 7D, the duct assembly 70 is shown having upright duct 76 fluidly connected to upper duct 90 for providing air to downwardly opening vent 114 which is shown aligned with venting slot 150 disposed in the wall covering assembly 62. Air flow in the direction as indicated by arrow 140 is provided through ports 132A, which align with access aperture 85 in upright duct 76.

Figure 8A:
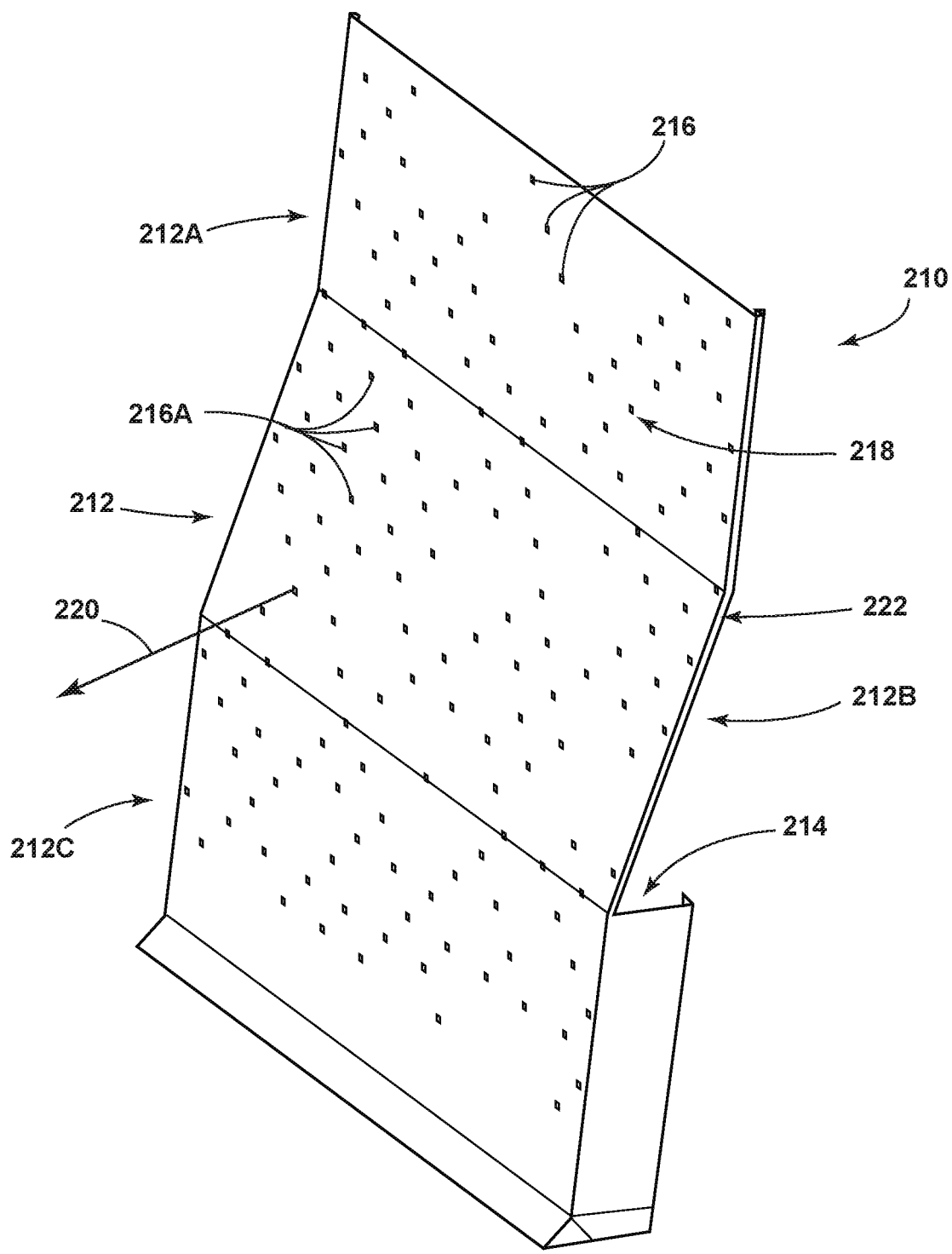
FIG. 8A is a front perspective view of a rear wall of a wall covering assembly according to another embodiment.

Referring now to FIG. 8A, another embodiment of a wall covering assembly 210 is shown having a rear wall 212. It is contemplated that the wall covering assembly 210 will also include a top wall similar to top wall 66 shown and described above with wall covering assembly 62. The rear wall 212 of wall covering assembly 210 includes an upper portion 212A, a middle portion 212B and a bottom portion 212C. The middle portion 212B is an inclined portion which creates a housing area 214 disposed behind the rear wall 212 for housing components for cooling a refrigerator. The rear wall 212 includes a plurality of ports 216 disposed in a pattern 218 along the upper, middle and bottom portions 212A, 212B, 212C of the rear wall 212. In this way, the rear wall 212 includes a pattern 218 of ports 216 substantially covering the entirety of the rear wall 212. The ports 216 are contemplated to be optimally sized to sufficiently provide air in an outward direction as indicated by arrow 220 into a refrigerator cabinet, such as refrigerator cabinet 12 described above. It is contemplated that a number of the ports 216 will be aesthetic only, while other ports 216A may be aligned with access apertures disposed in a duct assembly, such as access apertures 85 shown in duct assembly 70 and described above. Thus, the rear wall 212 of the wall covering assembly 210 includes a ventilated portion 222 which includes a pattern 218 of ports 216 disposed substantially throughout the entirety of the rear wall 212. While only ports 216A provide air flow in the direction as indicated by arrow 220 into the refrigerator cabinet, the remaining ports 216 provide the overall patterned appearance for the rear wall 212 of the wall covering assembly 210. The ports 216 may include round, square, or other like shaped apertures for adequately providing air flow into a refrigerator cabinet. Further, combination of variously shaped apertures may be used for the ports 216 and 216A for providing a variety of patterns 218 on the rear wall 212 of wall covering assembly 210. Thus, the ports 216 and 216A function in a similar manner as the ports 132, 132A described above with wall covering assembly 62. In the embodiment shown in FIG. 8A, the rear wall 212 is a fully ventilated rear wall 212, whereas the rear wall 64 of wall covering assembly 62 included only a ventilated portion 130.

Figure 8B:
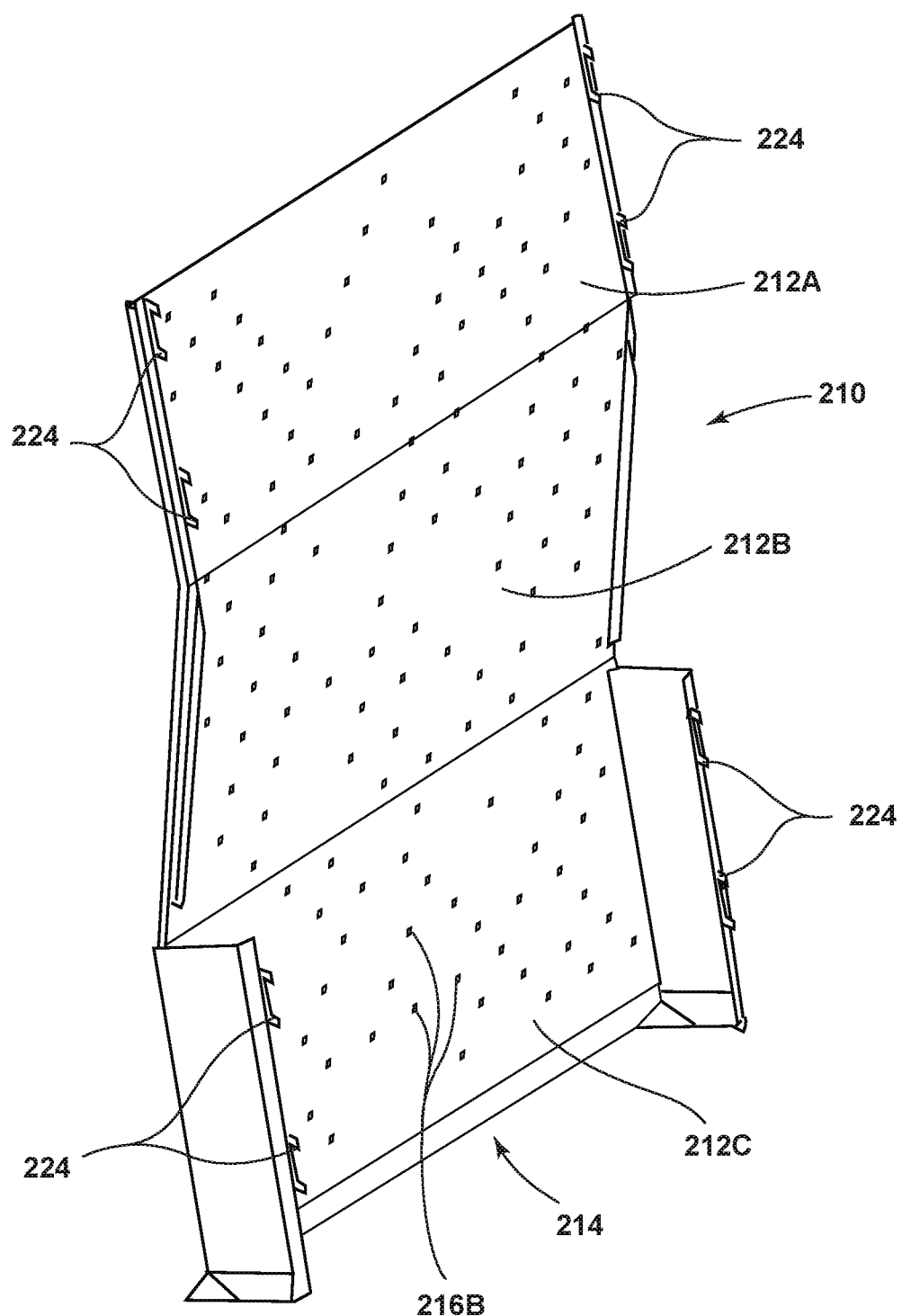
FIG. 8B is a rear perspective view of the rear wall of FIG. 8A.

Referring now to FIG. 8B, a rearview of the wall covering assembly 210 is shown with attachment features 224 disposed thereon for coupling the rear wall 212 to the inside of a refrigerator cabinet. With the bottom portion 212C being a ventilated portion, it is contemplated that the housing area 214 may include a radial fan that directly provides air flow into a refrigerator cabinet at ports 216B. Such a cooling configuration may provide a quick chill feature to the refrigerator cabinet and access through ports 216B may be selectively provided when desired by a user.

Figure 9:
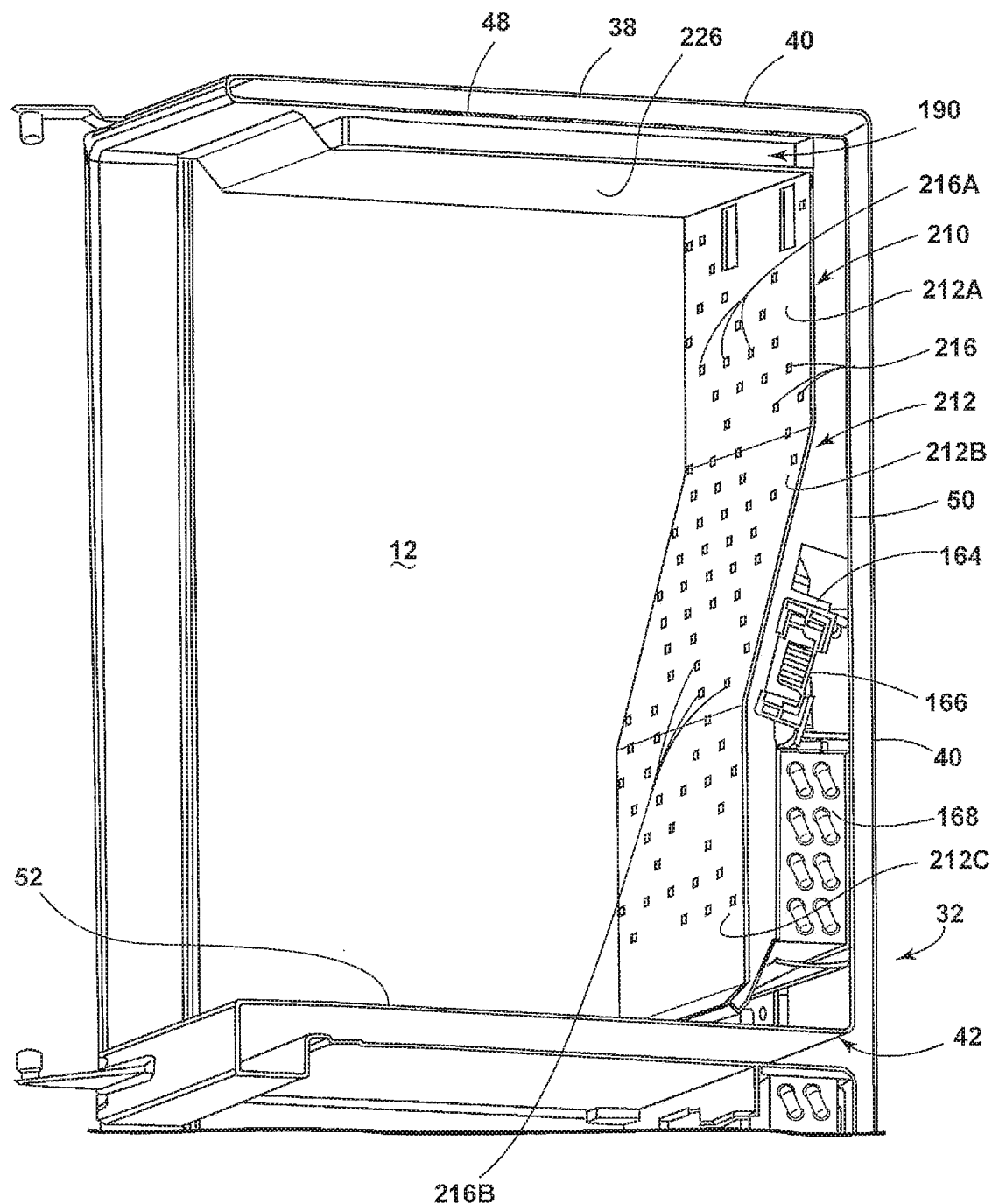
FIG. 9 is a cross-sectional view of the rear wall of FIG. 8A disposed within a refrigerator cabinet.

Referring now to FIG. 9, the wall covering assembly 210 is shown disposed within the refrigerator cabinet 12. The wall covering assembly 210 includes a top wall 226 which is similar to top wall 66 shown and described above. The radial fan 166 is disposed within the radial fan housing 164 adjacent an evaporator 168 for providing cooling into the refrigerator cabinet 12. As shown in FIG. 9, the top wall 226 and the rear wall 212 of the wall covering assembly 210 are disposed adjacent to the top wall 48 and rear wall 50 of the refrigerator liner 42 such that a spacing 190 is created therebetween for housing a duct assembly, such as duct assembly 70 shown and described above. In the embodiment shown in FIG. 9, ports 216B are disposed on the inclined portion or middle portion 212B of rear wall 212 for directly providing air into the refrigerator cabinet 12 as propelled by the radial fan 166.

Figure 10:
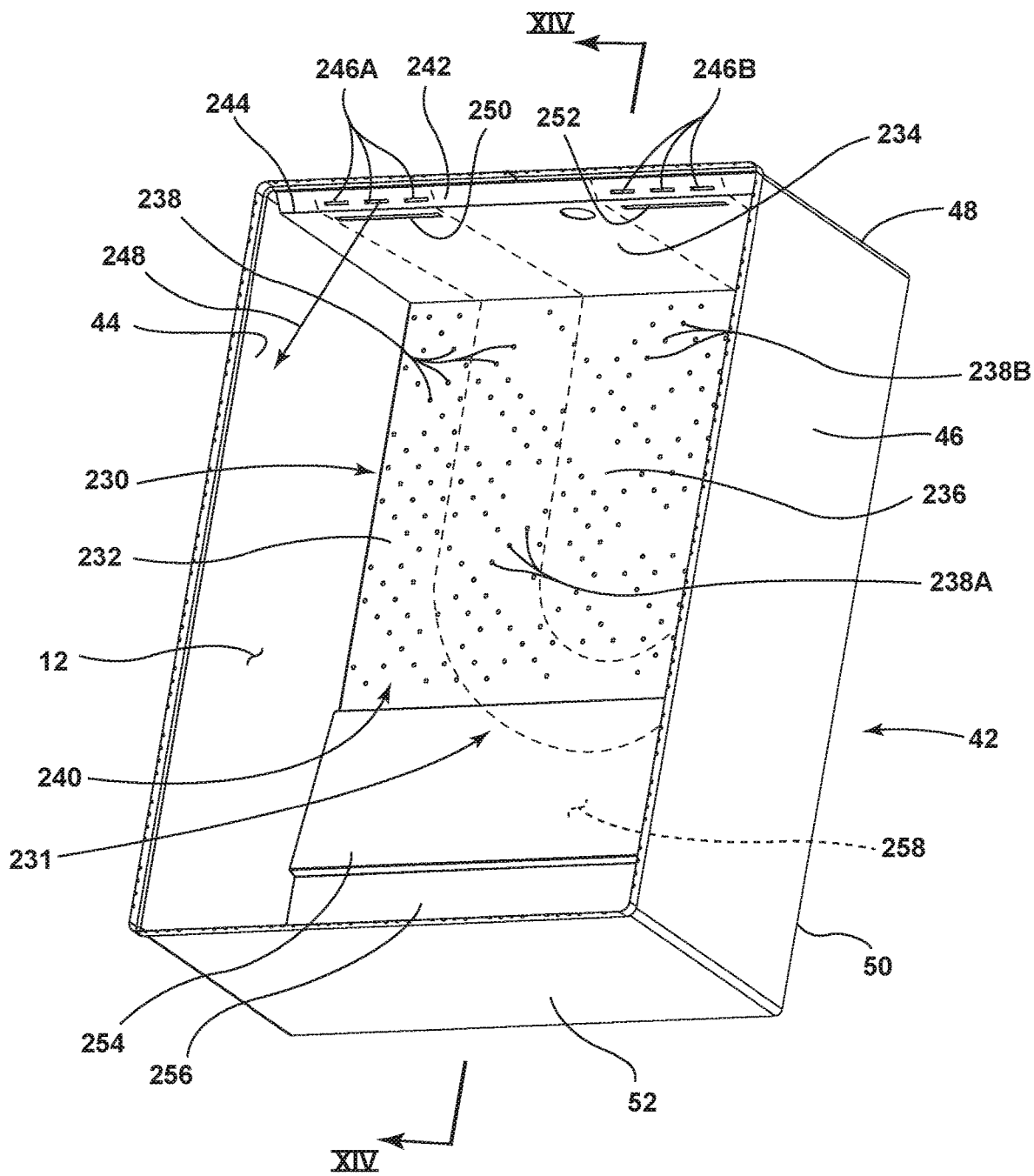
FIG. 10 is a bottom perspective view of a refrigerator liner and wall covering assembly according to another embodiment.

Referring now to FIG. 10, another embodiment of a wall covering assembly 230 is shown having a rear wall 232 and a top wall 234. The wall covering assembly 230 is contemplated to be received in a refrigerator liner 42 in a manner similar to wall covering assembly 62 discussed above. In this way, the wall covering assembly 230 defines rearmost and uppermost parameters of the refrigerator cabinet 12 at rear wall 232 and top wall 234. Further, the wall covering assembly 230 is used to conceal an air distribution system 231 in a manner similar to wall covering assembly 62 discussed above. As shown in FIG. 10, the rear wall 232 is substantially vertical as disposed within refrigerator liner 42, and top wall 234 extends outwardly from the rear wall 232 in a substantially perpendicular manner. As shown in FIG. 10, the rear wall 232 includes a ventilated portion 236 which is a substantially planar portion having a plurality of ports 238 disposed therethrough. Specifically, the ports 238 define venting apertures dispersed across the ventilated portion 236, such that the entire ventilated portion 236 includes a designed pattern 240 made up of the ports 238 disposed therethrough. Thus, it is contemplated that the pattern 240 of ports 238 extends across the entirety of the ventilated portion 236 between the sidewalls 44 and 46 of the refrigerator liner 42. The pattern 240 of ports 238 includes a first set of ports 238A that are in communication with the air distribution system 231. The pattern 240 of ports 238 further includes a second set of ports 238B that are in communication with a cavity similar to cavity 190 formed between the spaced-apart portions of the refrigerator liner 42 and the wall covering assembly 230, as discussed above. In use, ports 238A introduce cooled air into the refrigerator cabinet 12, while ports 238B will help provide for a complete pattern 240 extending across the entire ventilated portion 236 of rear wall 232. It is further contemplated that the entirety of the rear wall 232 can be a ventilated portion, such as depicted on rear wall 212 of FIG. 8A discussed above.

As further shown in FIG. 10, the top wall 234 of the wall covering assembly 230 includes a front lip portion 242 disposed at a forward most edge 244 of the top wall 234. The front lip portion 242 is an upwardly angled portion connecting the forward most edge 244 of the top wall 234 with the top wall 48 of the refrigerator liner 42. On the front lip portion 242, a number of angled venting slots 246A and 246B are disposed which are in communication with the air distribution system 231. Specifically, the angled venting slots 246A and 246B are in communication with a lateral portion of the air distribution system 231 as best described below with reference to FIG. 13. The angled venting slots 246A and 246B are angled outward and downward in a direction as indicated by arrow 248. With the location of the angled venting slots 246A and 246B on the top wall 234 of wall covering assembly 230, the angled venting slots 246A and 246B are positioned at an upper portion of the refrigerator cabinet 12. This location provides the angled venting slots 246A and 246B with access to storage bins and shelves disposed on upper inner surfaces of the doors 18 and 20 (FIG. 1) to cool these compartments without disruption from the air curtain, as best shown in FIG. 14.

Figure 13:
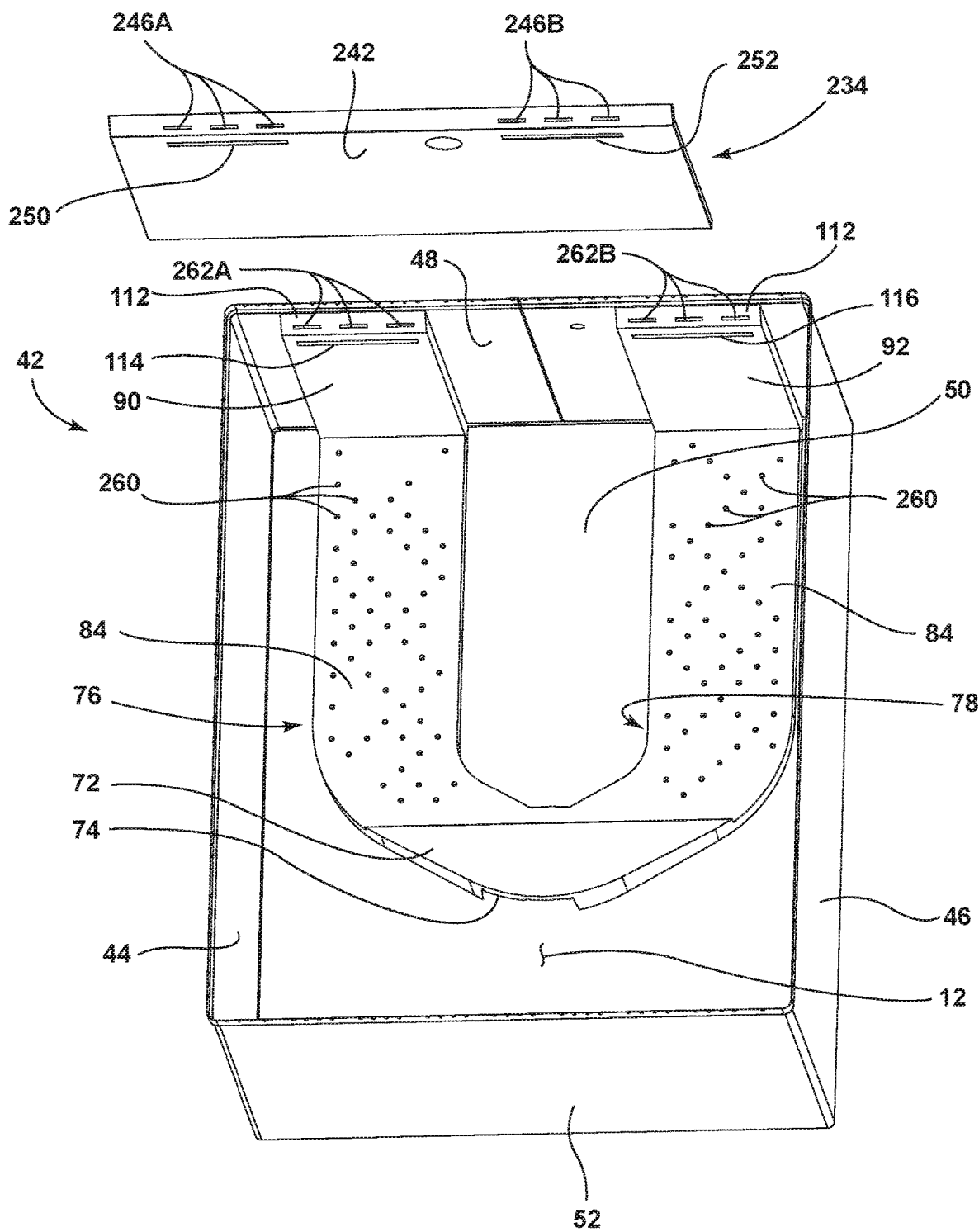
FIG. 13 is a bottom perspective view of the refrigerator liner and wall covering assembly of FIG. 12 with a top wall of the wall covering assembly exploded away.
Figure 14:
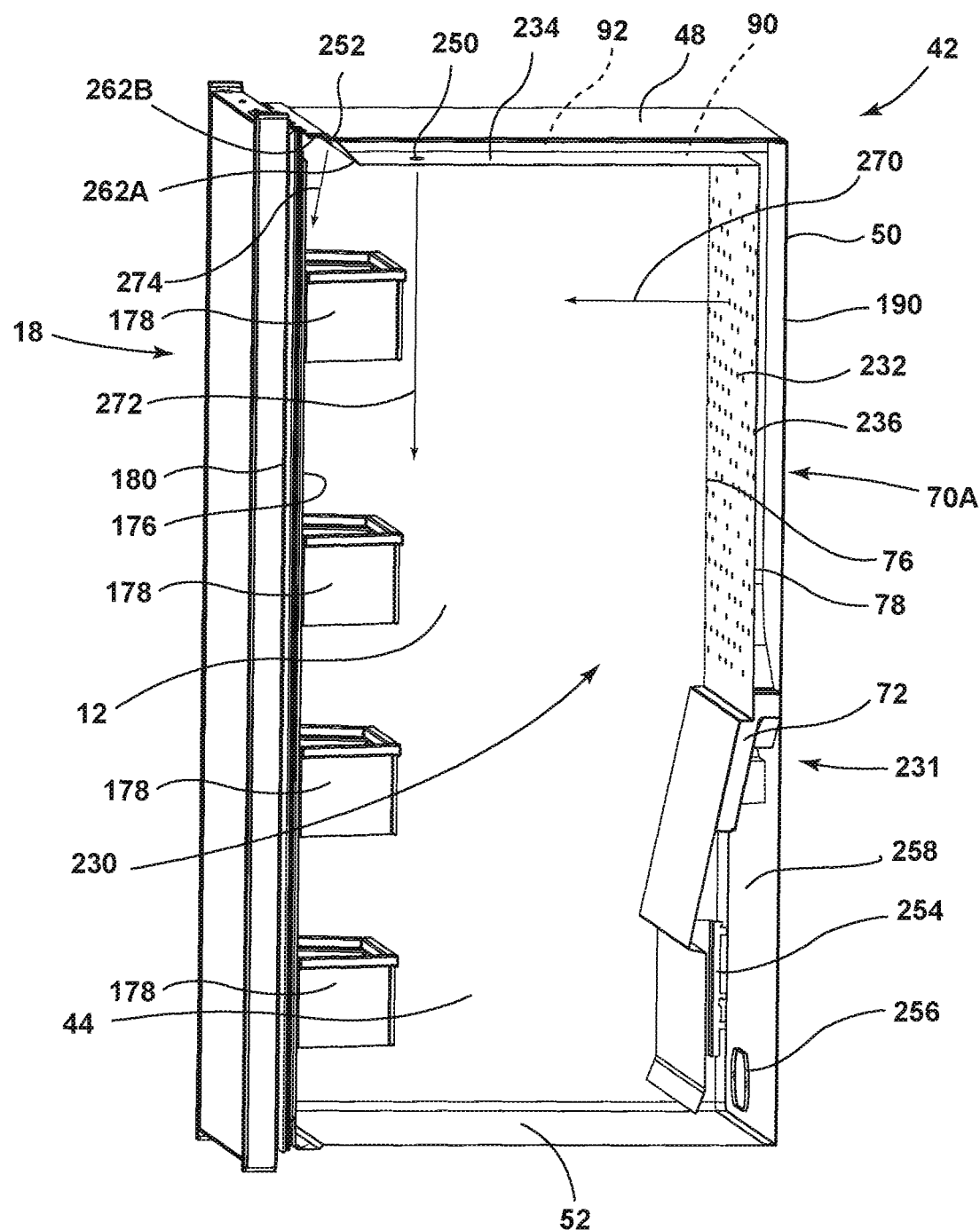
FIG. 14 is a cross-sectional view of the refrigerator liner and wall covering assembly of FIG. 10 taken at line XIV showing relative air distribution within a refrigerator cabinet.

As further shown in FIG. 10, the top wall 234 includes venting slots 250, 252 which are configured to align with downwardly opening vents of a duct assembly of the air distribution system 231, as best shown in FIG. 13. In this way, an air curtain is formed through venting slots 250, 252 in a manner similar to air curtain AC shown and described above with reference to FIG. 5 emanating from venting slots 150, 152. Thus, in the embodiment shown in FIG. 10, the wall covering assembly 230 provides an air curtain from venting slots 250, 252, such that air exiting the ports 238A will be disrupted from directly contacting the inner surfaces of the doors 18, 20 (FIG. 1) of the refrigerator 10, and also from directly contacting the gasket assemblies disposed around the doors 18, 20, while angled venting slots 246A and 246B provide cooling to selection portions of the inside surfaces of the doors 18, 20 to cool food storage assemblies disposed thereon. This airflow arrangement is further described below with reference to FIG. 14.

As further shown in FIG. 10, the wall covering assembly 230 also includes an inwardly inclined portion 254 and a base portion 256 which generally define a housing area 258 which is used to house and conceal components used to cool air for cooling the refrigerator cabinet 12. Such components may include fans for directing the cooled air, evaporators, condensers and other components (i.e., electrical components) of the refrigerator 10.

Figure 11:
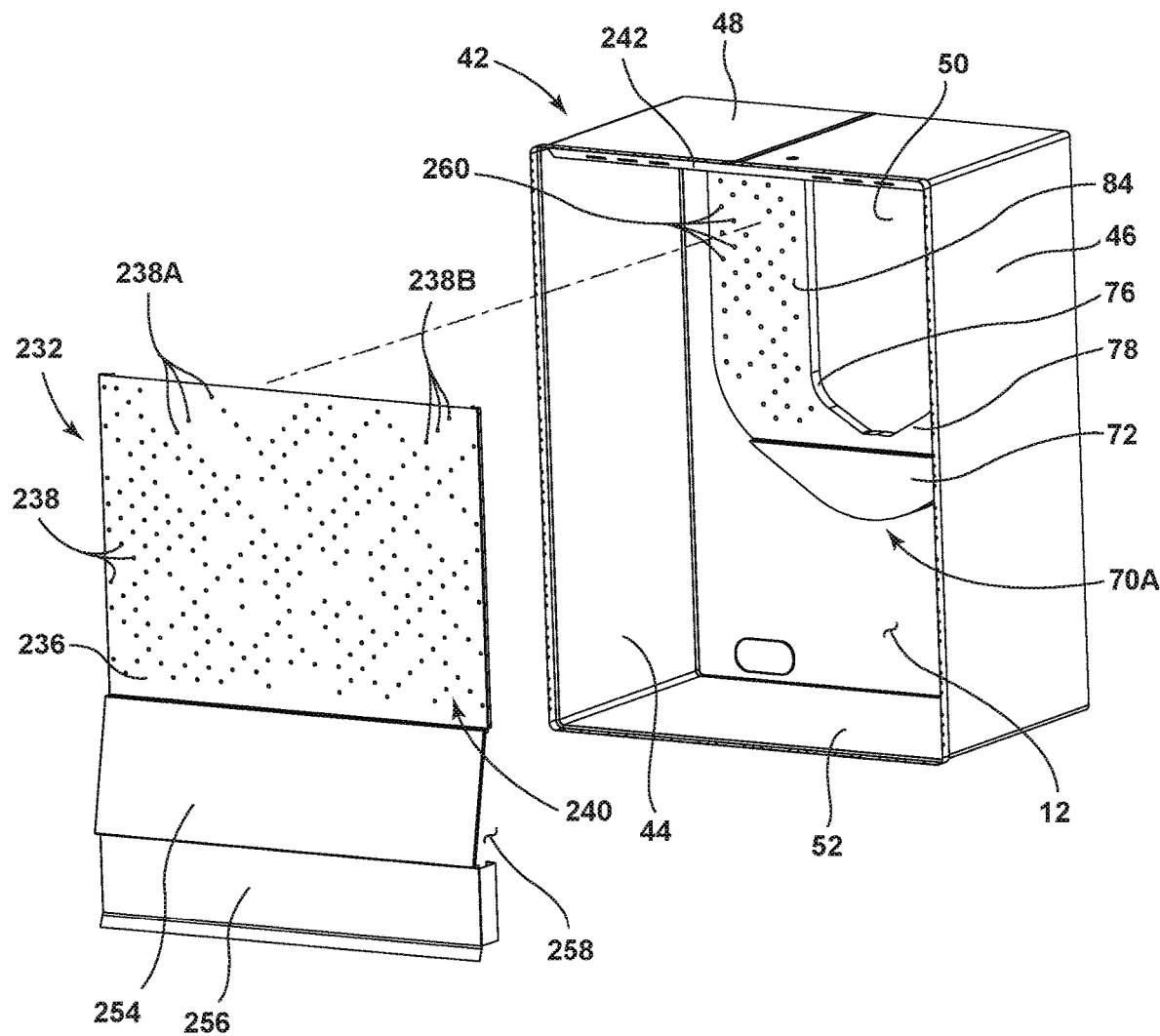
FIG. 11 is a top perspective view of the refrigerator liner and wall covering assembly of FIG. 10 with a rear wall of the wall covering assembly exploded away.
Figure 12:
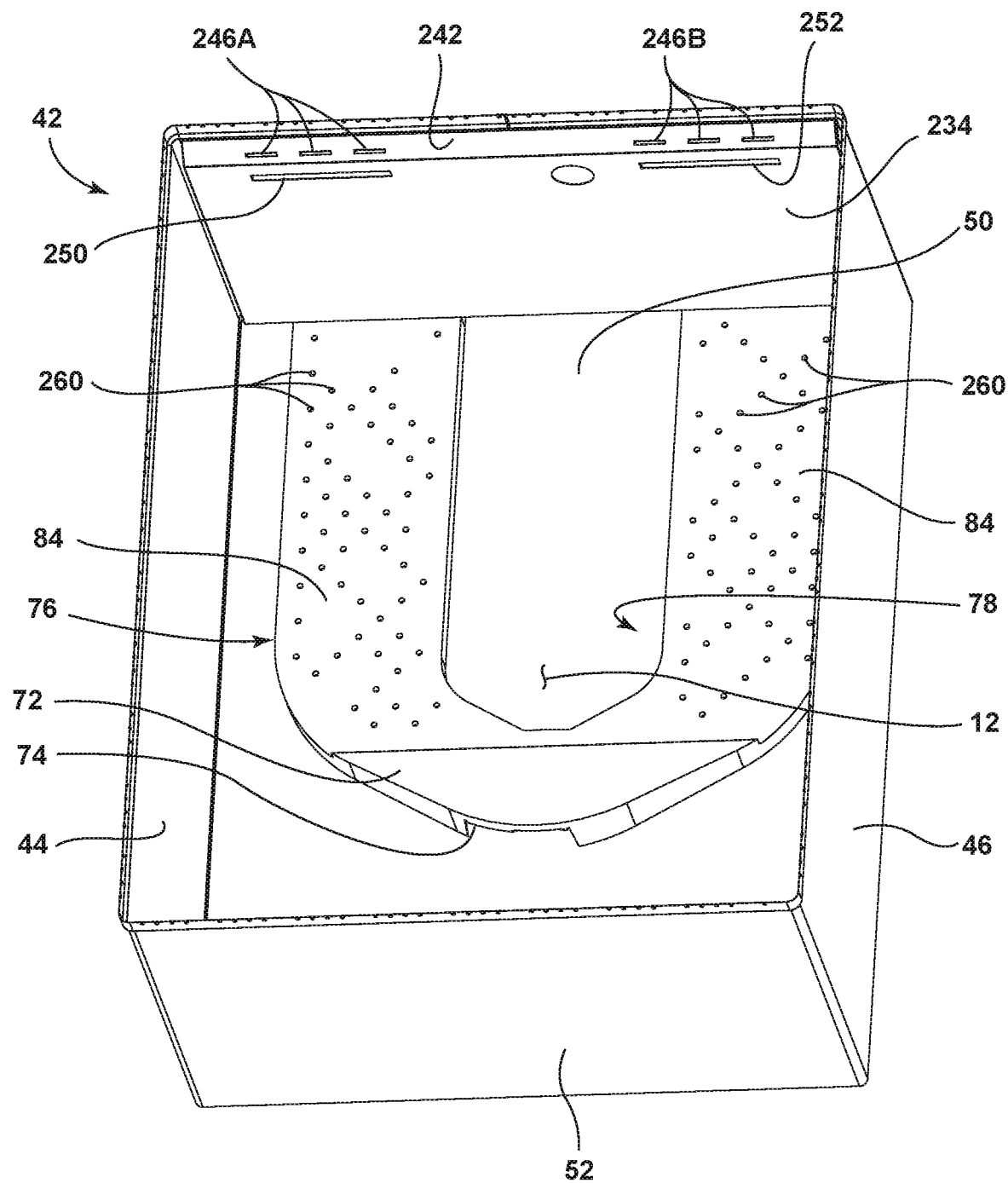
FIG. 12 is a bottom perspective view of the refrigerator liner and wall covering assembly of FIG. 11.

Referring now to FIG. 11, rear wall 232 is shown exploded away from the refrigerator cabinet 12 to reveal a duct assembly 70A shown disposed on the rear wall 50 of the refrigerator liner 42. The duct assembly 70A is akin to duct assembly 70 shown and described above, such that like reference numerals are used herein to describe similar features of duct assembly 70A. Much like duct assembly 70, duct assembly 70A is part of the air distribution system 231 configured to be concealed by the wall covering assembly 230, as best shown in FIG. 10. The duct assembly 70A includes a lower portion 72 having a lower opening 74 (FIG. 12) disposed therethrough. In assembly, the lower opening 74 is configured to align with a housing for a radial fan for providing air to the duct assembly 70A, such as radial fan 166 shown in FIG. 6. Extending upwardly from the lower portion 72, and best shown in FIG. 12, first and second upright ducts 76, 78 define an upright portion of the duct assembly 70A. The front walls 84 of the first and second upright ducts 76, 78 include access apertures 260 which are disposed in a complimentary pattern relative to pattern 240 of the ports 238 disposed on rear wall 232. Specifically, the access apertures 260 are configured to align with the associated ports 238A disposed through the ventilated portion 236 of rear wall 232 to provide cooled air to the refrigerator compartment 12 through the wall covering assembly 230.

Referring now to FIG. 13, the top wall 234 of the wall covering assembly 230 is shown exploded away from the refrigerator cabinet 12 to reveal first and second upper ducts 90, 92 of the duct assembly 70A shown disposed on the top wall 48 of the refrigerator liner 42. The first and second upper ducts 90, 92 outwardly extend in a substantially horizontal manner relative to the first and second upright ducts 76, 78 to define a lateral portion of the duct assembly 70A. Air is powered by the fan of the air distribution system 231 (FIG. 10) and is directed from the first and second upright ducts 76, 78 to the first and second upper ducts 90, 92. Air travels horizontally along the first and second upper ducts 90, 92 and is then directed downwardly through downwardly opening vents 114, 116 into the refrigerator cabinet 12 to provide an air curtain within the refrigerator cabinet 12. In assembly, the venting slots 250, 252 of the top wall 234 of the wall covering assembly 230 align with the downwardly opening vents 114, 116 disposed on the first and second upper ducts 90, 92, respectively. Further, the first and second upper ducts 90, 92 include end walls 112 having the venting apertures 262A and 262B disposed thereon. End walls 112 are contemplated to be disposed at a complementary angle relative to the front lip portion 242 of top wall 234. In assembly, the venting apertures 262A and 262B of the first and second upper ducts 90, 92 align with the angled venting slots 246A and 246B disposed on front lip portion 242 of the top wall 234 of the wall covering assembly 230 to provide cooled air from the duct assembly 70A to the storage compartments or bins disposed on the inner surfaces of the doors 18, 20, as shown in FIG. 14.

Referring now to FIG. 14, a cross-sectional view of the refrigerator compartment 12 of FIG. 10 is shown. In this view, the air distribution within the refrigerator compartment 12 is depicted. Specifically, cooled air emanating from the rear wall 232 of the wall covering assembly 230 is introduced into the refrigerator compartment 12 along a substantially horizontal path as indicated by arrow 270. This air is introduced through the first set of ports 238A of the rear wall 232 shown in FIG. 10. As the cooled air flowing along the path as indicated by arrow 270 approaches the doors 18, 20 of the refrigerator 10, the cooled air is disrupted by the downwardly directed air curtain introduced into the refrigerator compartment 12 at venting slots 250, 252 of the top wall 234 along a path as indicated by arrow 272. This disruption helps to keep cooled air in the refrigerator compartment 12 and further prevents cooled air from directly contacting gasket assemblies 180 of the doors 18, 20, as described above. As further shown in FIG. 14, door 18 includes an inner surface 176 having a plurality of storage bins 178 disposed thereon. The storage bins 178 are contemplated to be adjustable members that couple to the inner surface 176 of the door 18. Cooled air is directed towards the storage bins 178 along the path as indicated by arrow 274 for cooling the contents of the bins 178 in use. The air directed along the path indicated by arrow 274 emanates from the angled venting slots 246A and 246B disposed on front lip portion 242 of the top wall 234 of the wall covering assembly 230. In this way, the air flow at arrow 274 that is used to cool the contents of the storage bins 178 is uninterrupted by the downwardly directed air curtain depicted at arrow 272. It is further contemplated that the angled venting slots 246A and 246B disposed on front lip portion 242 of the top wall 234 of the wall covering assembly 230 are finely tuned to concentrate airflow on the storage bins 178 of the inner surface 176 of the door 18, and therefore do not direct air towards the gasket assembly 180 of the door 18.

Figure 15A:
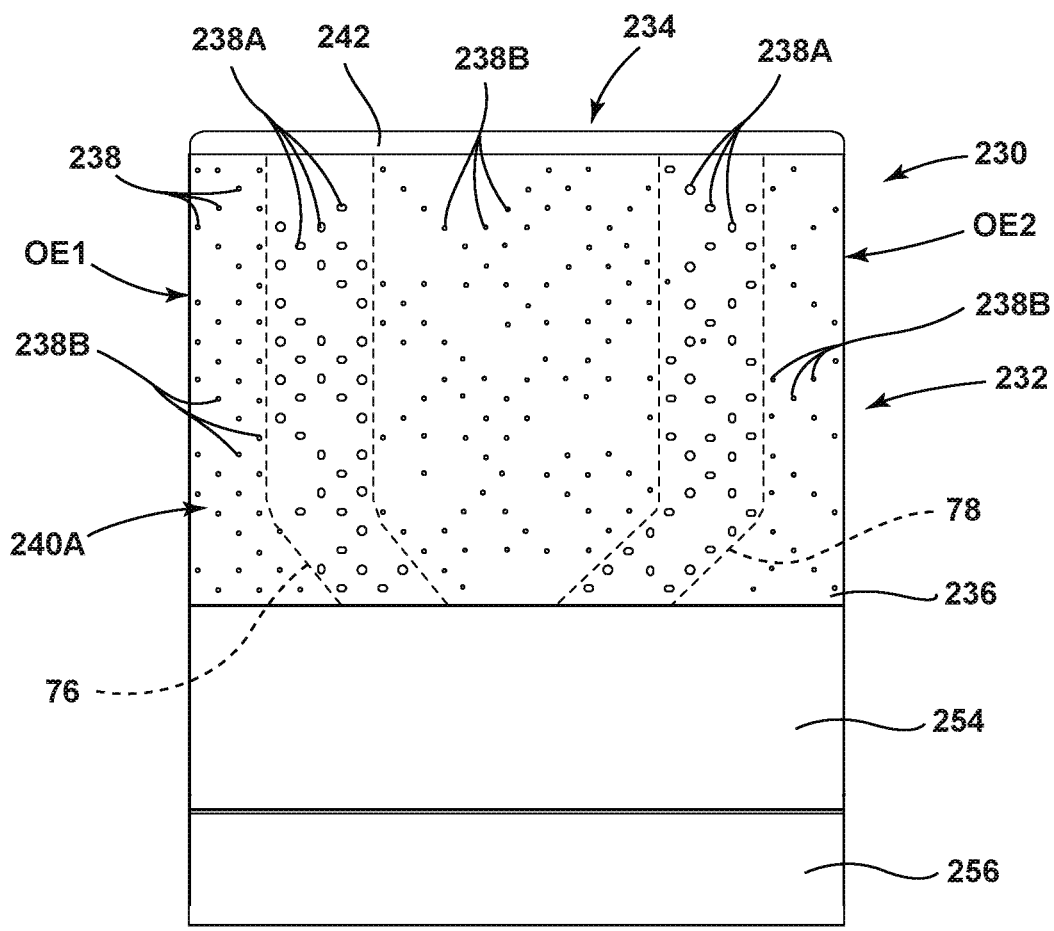
FIG. 15A is a front elevational view of a wall covering assembly according to another embodiment.
Figure 15B:
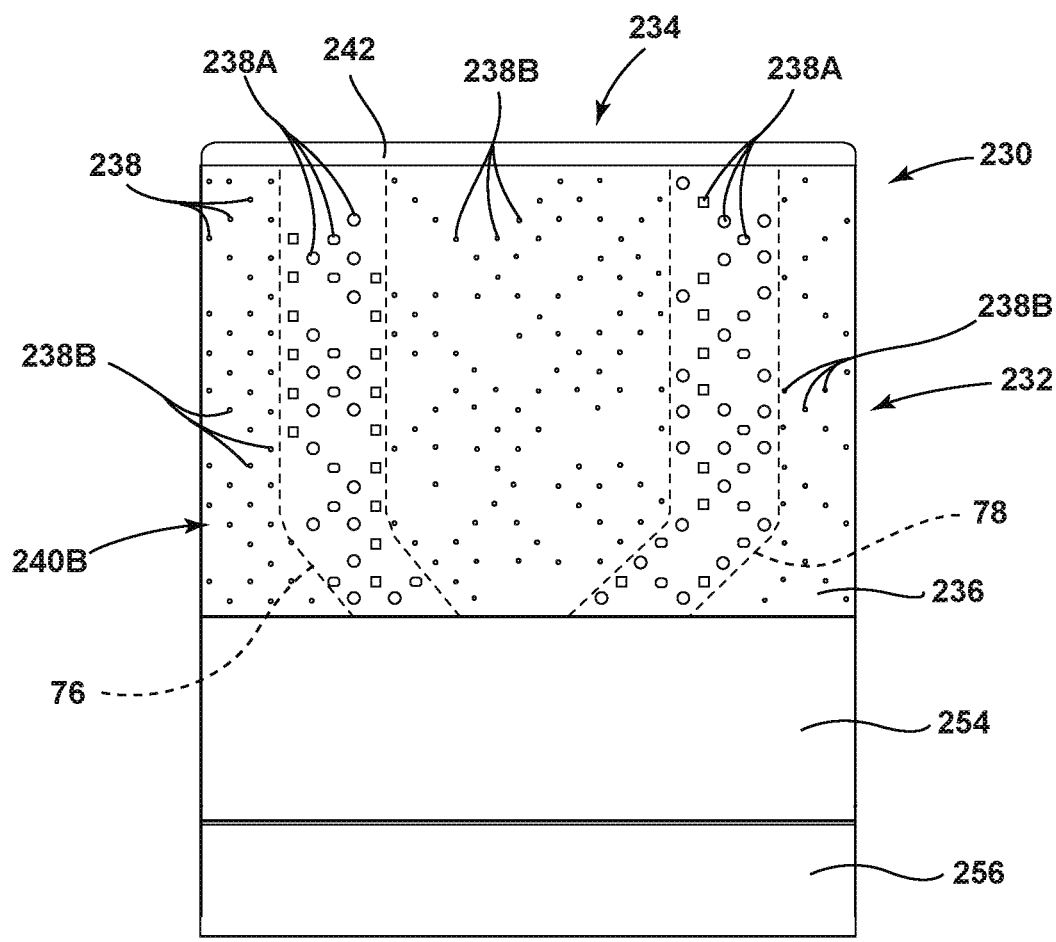
FIG. 15B is a front elevational view of a wall covering assembly according to another embodiment.

Referring now to FIGS. 15A, 15B, the wall covering assembly 230 is shown having the ventilated portion 236 with a plurality of ports 238 disposed therethrough. With specific reference to FIG. 15A, the ports 238 are shown in a pattern 240A which includes a first group of ports 238A which are disposed adjacent to the first and second upright ducts 76, 78, such that ports 238A are in communication with the air distribution system 231 to introduce cooled air into the refrigerator compartment 12 in a substantially horizontal manner. The ports 238A shown in FIG. 15A are contemplated to be round ports having a diameter of approximately 10 mm. The second set of ports 238B may include round ports having a diameter of approximately 7 mm. In the embodiment shown in FIG. 15A, the ports 238A generally follow the contours of the first and second upright ducts 76, 78 as shown in the phantom lines provided in FIG. 15A. Thus, the ports 238 of the embodiment shown in FIG. 15A are arranged in a pattern 240A that covers the entirety of ventilated portion 236 of rear wall 232 between opposite ends OE1 and OE2 thereof. The pattern 240A includes a first set of ports 238A that are in communication with the air distribution system 231 along the first and second upright ducts 76, 78, and a second set of ports 238B which open into the refrigerator cabinet 12 on one side of the rear wall 232, and open into a cavity 190 (FIG. 7B) defined between the rear wall 232 of the wall covering assembly 230 and the rear wall 50 of the refrigerator liner 42 on an opposite side of the rear wall 232.

With specific reference to FIG. 15B, the ports 238 are shown in a pattern 240B which includes a first group of ports 238A which are disposed adjacent to the first and second upright ducts 76, 78, such that ports 238A are in communication with the air distribution system 231 to introduce cooled air into the refrigerator compartment 12 in a substantially horizontal manner. The ports 238A shown in FIG. 15B are contemplated to be round ports having a diameter of approximately 13 mm. The second set of ports 238B may include round ports having a diameter of approximately 8 mm. While the embodiments shown in FIGS. 15A and 15B include mainly round ports 238, it is contemplated that other port shapes can be used having other dimensions to provide an aesthetically pleasing pattern covering, or partially covering, the ventilated portion 236 of the rear wall 232. As further shown in the embodiment of FIG. 15B, the ports 238A generally follow the contours of the first and second upright ducts 76, 78 as shown in the phantom lines provided in FIG. 15B. In FIG. 15B, the pattern 240B of ports 238 cover the entirety of ventilated portion 236 of rear wall 232 between opposite ends OE1 and OE2 thereof, however, it is contemplated that pattern 240B may cover only a portion of the ventilated portion 236 to achieve a desired aesthetic for the pattern 240B. The pattern 240B includes a first set of ports 238A that are in communication with the air distribution system 231 along the first and second upright ducts 76, 78, and a second set of ports 238B which open into the refrigerator cabinet 12 on one side of the rear wall 232, and open into a cavity 190 (FIG. 14) defined between the rear wall 232 of the wall covering assembly 230 and the rear wall 50 of the refrigerator liner 42 on an opposite side of the rear wall 232.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigerator, comprising:
   an external wrapper;
   a liner disposed within the external wrapper, the liner including a top wall, first and second sidewalls, a bottom wall and a rear wall;
   a wall covering assembly having a top wall disposed adjacent to and spaced-apart from the top wall of the liner and a rear wall disposed adjacent to and spaced-apart from the rear wall of the liner, wherein the liner and the wall covering assembly cooperate to define a refrigerator cabinet;
   a cavity formed between liner and the wall covering assembly, the cavity including a first portion disposed between the rear wall of the liner and the rear wall of the wall covering assembly, and a second portion disposed between the top wall of the liner and the top wall of the wall covering assembly; and
   a duct assembly having an upright portion disposed in the first portion of the cavity and a lateral portion disposed in the second portion of the cavity, wherein the upright portion of the duct assembly includes first and second upright ducts that open outwardly towards the rear wall of the liner, and further wherein the lateral portion of the duct assembly includes one or more downwardly opening vents that are aligned with and open into associated venting slots disposed through the top wall of the wall covering assembly above a front portion of the refrigerator cabinet.

2. The refrigerator of claim 1, wherein the rear wall of the wall covering assembly includes a ventilated portion having a plurality of ports disposed through the rear wall.

3. The refrigerator of claim 2, wherein the upright portion of the duct assembly includes one or more access apertures opening into the ventilated portion of the wall covering assembly to provide cooled air to the refrigerator cabinet emanating from the rear wall of the wall covering assembly.

4. The refrigerator of claim 1, including:
one or more doors operably coupled to the external wrapper and operable between open and closed positions to selectively open and close the refrigerator cabinet, wherein the cooled air emanating from the rear wall of the wall covering assembly is directed towards the one or more doors within the refrigerator cabinet.

5. The refrigerator of claim 4, including:
a gasket assembly forming a seal between the one or more doors and the external wrapper when the one or more doors are in the closed position.

6. The refrigerator of claim 1, wherein the duct assembly provides a downwardly directed air curtain at the front portion of the refrigerator cabinet through the venting slots disposed through the top wall of the wall covering assembly.

7. The refrigerator of claim 6, wherein the downwardly directed air curtain disrupts a flow of the cooled air emanating from the rear wall of the wall covering assembly, such that the flow of cooled air does not directly contact the gasket assembly without disruption.

8. The refrigerator of claim 7, wherein the downwardly directed air curtain retains the cooled air emanating from the rear wall of the wall covering assembly within the refrigerator cabinet.

9. A refrigerator, comprising:
a liner having a top wall and a rear wall;
a wall covering assembly having a top wall and a rear wall with a ventilated portion, wherein the wall covering assembly is spaced-apart from the liner to form a cavity therebetween; and
a duct assembly including an upright portion disposed along the rear wall of the wall covering assembly, the upright portion having one or more access apertures opening into the ventilated portion of the rear wall of the wall covering assembly to deliver cooled air to a refrigerator cabinet defined by the wall covering assembly and the liner, and further wherein the upright portion of the duct assembly includes first and second upright ducts that open outwardly towards the rear wall of the liner, and further wherein the one or more access apertures are disposed on a front wall of the first and second upright ducts.

10. The refrigerator assembly of claim 9, including:
first and second lateral ducts fluidly connected to the first and second upright ducts, wherein the first and second lateral ducts open upwardly into the top wall of the liner.

11. The refrigerator assembly of claim 10, wherein the first and second lateral ducts include downwardly opening vents disposed above a front portion of the refrigerator cabinet, and further wherein the first and second lateral ducts provide an air curtain of downwardly directed air from the downwardly opening vents through the wall covering assembly.

12. The refrigerator assembly of claim 11, wherein the downwardly directed air curtain disrupts a flow of the cooled air from the ventilated portion of the rear wall of the wall covering assembly.

13. A refrigerator, comprising:
a liner having a top wall, a rear wall, first and second sidewalls and a bottom wall;
a wall covering assembly having a top wall disposed adjacent to and spaced-apart from the top wall of the liner and a rear wall disposed adjacent to and spaced-apart from the rear wall of the liner, wherein the liner and the wall covering assembly cooperate to define a refrigerator cabinet, and further wherein the rear wall of the wall covering assembly includes a ventilated portion for providing outwardly directed air to the refrigerator cabinet; and
a duct assembly disposed between the wall covering assembly and the liner, wherein the duct assembly includes first and second upright ducts defining an upright portion of the duct assembly and first and second lateral ducts fluidly connected to the first and second upright ducts, and further wherein the duct assembly is configured to deliver air to a front portion of the refrigerator cabinet to create a downwardly directed air curtain at the front portion of the refrigerator cabinet, and further wherein the air curtain disrupts a flow of the outwardly directed air from the ventilated portion of the wall covering assembly, and further wherein the upright portion of the duct assembly includes one or more access apertures opening into the ventilated portion of the rear wall of the wall covering assembly.

14. The refrigerator of claim 13, wherein the ventilated portion of the rear wall of the wall covering assembly includes a plurality of ports disposed therethrough.

15. The refrigerator of claim 14, wherein the plurality of ports are arranged in a pattern substantially covering an entirety of the ventilated portion of the wall covering assembly between the first and second sidewalls of the liner.

16. The refrigerator of claim 15, wherein a portion of the ports of the plurality of ports disposed on the ventilated portion of the wall covering assembly align with the one or more access apertures of the upright portion of the duct assembly to deliver the flow of outwardly directed air from the ventilated portion of the wall covering assembly.

17. The refrigerator of claim 13, including:
an evaporator disposed in a housing area defined between the wall covering assembly and the liner; and
a fan assembly in thermal communication with the evaporator and fluidly connected to the duct assembly within the housing area, the fan assembly configured to move cooled air from the evaporator to the duct assembly, wherein the evaporator and fan assembly are substantially concealed by the wall covering assembly within the refrigerator cabinet.

* * * * *